United States Patent
Komatsu et al.

(10) Patent No.: US 7,864,437 B2
(45) Date of Patent: Jan. 4, 2011

(54) ADAPTOR FOR MICROSCOPE AND MICROSCOPE APPARATUS (MICROSCOPE-USE ADAPTOR AND MICROSCOPE DEVICE)

(75) Inventors: Manabu Komatsu, Yokohama (JP); Toshio Uchikawa, Chigasaki (JP); Hiromasa Shibata, Yokohama (JP)

(73) Assignee: Nikon Corporation, Tokyo (JP)

( * ) Notice: Subject to any disclaimer, the term of this patent is extended or adjusted under 35 U.S.C. 154(b) by 487 days.

(21) Appl. No.: 11/817,316

(22) PCT Filed: Feb. 23, 2006

(86) PCT No.: PCT/JP2006/303921

§ 371 (c)(1),
(2), (4) Date: Aug. 28, 2007

(87) PCT Pub. No.: WO2006/093208

PCT Pub. Date: Sep. 8, 2006

(65) Prior Publication Data

US 2008/0259446 A1    Oct. 23, 2008

(30) Foreign Application Priority Data

Feb. 28, 2005  (JP) .............................. 2005-054762
Apr. 12, 2005  (JP) .............................. 2005-115006
Oct. 4, 2005   (JP) .............................. 2005-291822

(51) Int. Cl.
*G02B 21/02*    (2006.01)
*G03B 27/52*    (2006.01)

(52) U.S. Cl. .................. 359/661; 359/368; 359/656; 355/30; 355/72

(58) Field of Classification Search ......... 359/368–398, 359/656–661, 808–819
See application file for complete search history.

(56) References Cited

U.S. PATENT DOCUMENTS

| 3,837,731 A * | 9/1974 | Amos et al. .................. 359/656 |
| 4,367,018 A * | 1/1983 | Abe ........................... 351/213 |
| 2006/0274424 A1* | 12/2006 | Okazaki et al. ............. 359/661 |
| 2007/0252964 A1* | 11/2007 | Kohno et al. ................. 355/53 |
| 2008/0137056 A1* | 6/2008 | Fujiwara et al. .............. 355/72 |

FOREIGN PATENT DOCUMENTS

JP    59-71737 A    4/1984

* cited by examiner

*Primary Examiner*—Thong Nguyen
(74) *Attorney, Agent, or Firm*—Miles & Stockbridge P.C.

(57) ABSTRACT

A microscope apparatus efficiently supplies and collects a liquid for observation by local liquid immersion. The apparatus includes an objective of a liquid immersion system, a discharging member for discharging the liquid between a front edge of the objective and a substrate, and a sucking member for sucking the liquid. Inclined faces are provided respectively in two positions adjacent to the front edge in the periphery of the objective, and protruded portions are provided in positions adjacent to the inclined faces. An aperture portion bounded by the protruded portions and the substrate is formed at the side face. The discharging member includes a tubular member provided on the inclined face for discharging the liquid. The sucking member includes another tubular member for sucking the liquid while taking in air via the aperture portion.

18 Claims, 19 Drawing Sheets

ADAPTOR FOR MICROSCOPE AND MICROSCOPE APPARATUS (MICROSCOPE-USE ADAPTOR AND MICROSCOPE DEVICE)

TECHNICAL FIELD

The present invention relates to a microscope apparatus used for liquid immersion observation of a substrate or a specimen, and to an adaptor for a microscope that is provided between an objective lens and the specimen or the substrate.

BACKGROUND ARTS

Such a scheme is proposed (refer to, e.g., Japanese Patent Application Laid-Open Publication No. 2005-83800) that a numerical aperture of an objective lens is increased corresponding to a refractive index (>1) of a liquid in a way that fills a space between a front edge of the objective lens and the substrate with the liquid such as water by use of the objective lens of a liquid immersion system in order to observe, with a high resolution, flaws and foreign matters of a circuit pattern formed on the substrate (e.g., a semiconductor wafer and a liquid crystal substrate). Another scheme is proposed, which makes the observation in a state of local liquid immersion for attaining a compact configuration of the apparatus. In this case, after observing the substrate at every observation point while locally supplying the liquid, the liquid is collected.

The apparatus described above is, however, incapable of highly efficiently supplying or collecting the liquid when making the observation based on the local liquid immersion. Hence, the apparatus could not conduct the liquid immersion observation of the substrate at a high throughput.

DISCLOSURE OF THE INVENTION

The present invention aims at providing an adaptor for a microscope and a microscope apparatus that are capable of highly efficiently supplying or collecting a liquid when making observation based on local liquid immersion.

An adaptor for a microscope according to one aspect of the present invention for solving the problems given above is attached detachably to between a liquid immersion objective lens for the microscope that inspects an external appearance of a specimen and the specimen, the adaptor comprising:

a connecting portion connecting with the microscope;

inclined faces provided in the periphery of a front edge of the liquid immersion objective lens and provided respectively in two positions adjacent to the front edge in directions getting closer to an image side of the liquid immersion objective lens as it gets farther away from the front edge thereof;

protruded portions provided in positions adjacent to the inclined faces and protruding toward an object side of the liquid immersion objective lens from the inclined faces; and an aperture portion formed, one of the two inclined faces extending from the front edge to a side face of the liquid immersion objective lens, so as to be surrounded by the protruded portions and the specimen in the side face of the liquid immersion objective lens.

According to another aspect of the present invention, a microscope apparatus comprises:

support means supporting a substrate as an observation object;

an objective lens belonging to a liquid immersion system;

discharging means discharging a liquid to between a front edge of the objective lens and the substrate; and sucking means sucking the liquid from the substrate, wherein inclined faces are provided in the periphery of the front edge of the objective lens respectively in two positions adjacent to the front edge in directions getting closer to an image side of the objective lens as it gets farther away from the front edge thereof; and protruded portions are provided in positions adjacent to the inclined faces and protruding toward an object side of the objective lens from the inclined faces, one of the two inclined faces extends from the front edge to a side face of the objective lens, an aperture portion surrounded by the protruded portions and the substrate is formed in the side face, the discharging means includes a first tubular member provided on one inclined surface, a width of the first tubular member is narrower than a width of one inclined face, and the liquid is discharged by use of the first tubular member, and the sucking means includes a second tubular member provided on the other inclined face of the two inclined faces, a width of the second tubular member is larger than the width of the first tubular member, and the liquid is sucked while taking in the air from the aperture portion by use of the second tubular member.

According to still another aspect of the present invention, an adaptor for a microscope is attached detachably to between a liquid immersion objective lens for the microscope that inspects an external appearance of a specimen and the specimen, the adaptor comprising:

a connecting portion connecting with the microscope;

a liquid holding portion holding a liquid between the liquid immersion objective lens and the specimen; and a first path used for eliminating the liquid from the liquid holding portion.

According to yet another aspect of the present invention, a microscope apparatus comprises:

a microscope including a stage holding a specimen, a liquid immersion objective lens, liquid supplying means supplying the liquid to between a front edge of the liquid immersion objective lens and the specimen, and liquid eliminating means eliminating the liquid; and an adaptor for a microscope, including a connecting portion connecting to the liquid immersion objective lens or the microscope, a liquid holding portion holding the liquid between the liquid immersion objective lens and the specimen, and a first path used for eliminating the liquid from the liquid holding portion, wherein one end of the first path is connected to the liquid eliminating means.

The adaptor for the microscope and the microscope apparatus according to the present invention are capable of highly efficiently supplying or collecting the liquid when making the observation based on local liquid immersion.

BRIEF DESCRIPTION OF THE DRAWINGS

FIG. 1A shows a top view thereof; and FIG. 1B shows a sectional view thereof;

FIG. 3A shows a schematic sectional view of the configuration as viewed from sideway; and FIG. 3B shows a bottom view thereof;

BEST MODE FOR CARRYING OUT THE INVENTION

Embodiments of the present invention will hereinafter be described in detail with reference to the drawings.

First Embodiment

Figure 1A:
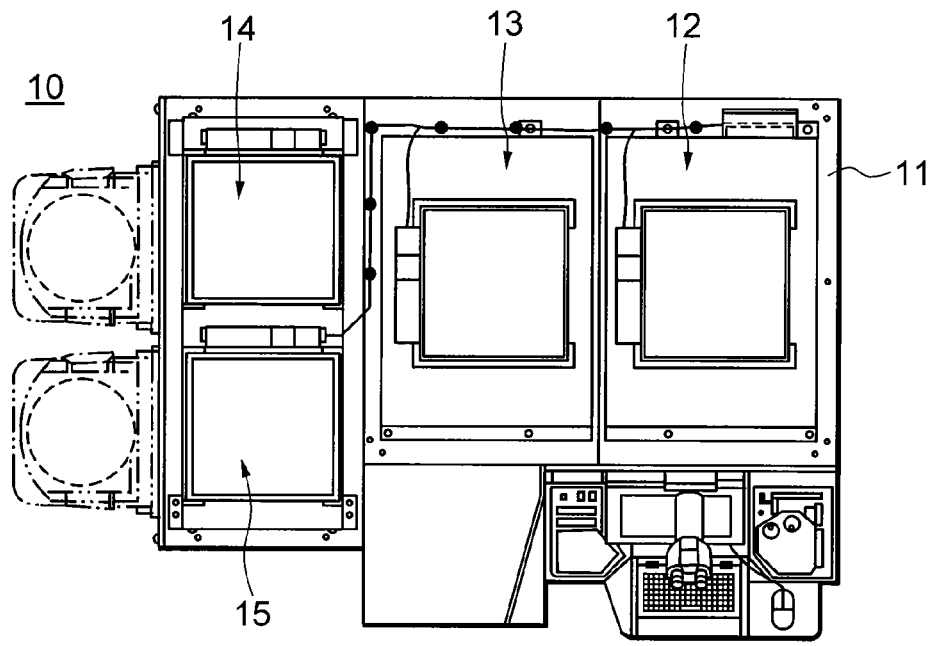
FIGS. 1A and 1B are views of a whole construction of a microscope apparatus 10 in a first embodiment of the present invention.
Figure 1B:
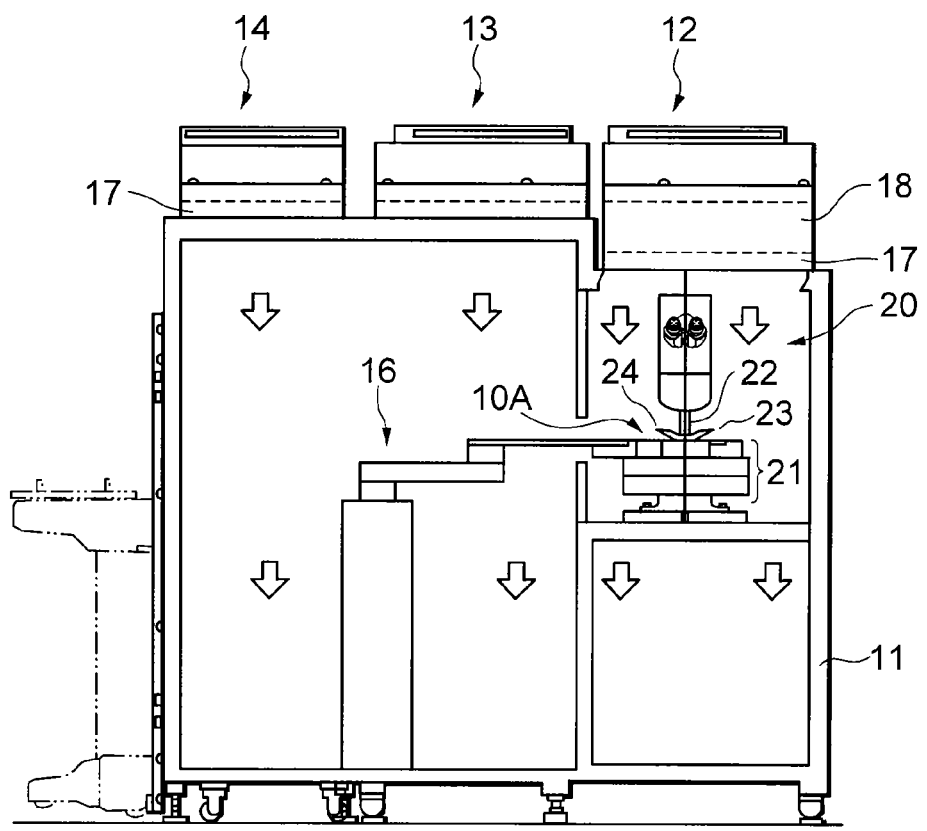

A microscope apparatus 10 in a first embodiment is constructed, as shown in FIGS. 1A and 1B, of a minienvironment device (11-15) and a liquid immersion microscope 20 installed in an interior of the minienvironment device. FIG. 1A is a top view of the microscope apparatus 10, and FIG. 1B is a sectional view thereof. A mechanism 16 automatically carrying a substrate 10A as an observation object is provided in the interior of the minienvironment device (11-15). The substrate 10A is exemplified by a semiconductor wafer or a liquid crystal substrate, etc. The microscope apparatus 10 is an apparatus that performs a liquid immersion observation (inspection for an external appearance) about flaws and foreign matters of a circuit pattern formed on the substrate 10A in a process of manufacturing a semiconductor circuit element or a liquid crystal display element. The circuit pattern is, e.g., an etching pattern. The minienvironment device (11-15) is built up by an enclosure 11 and a plurality of fan filter units 12-15 installed on an upper surface of the enclosure 11. The fan filter units 12-15 are mechanisms (FFUs: FAN FILTER UNITS) that remove minute intra-gas particles such as contaminants and dusts out of the ambient air (within a clean room) and thereafter introduces the clean air into the enclosure 11. Unillustrated vent holes are formed in the undersurface of the enclosure 11, whereby down-flows from the fan filter units 12-15 can be discharged to the outside (into the clean room). In FIG. 1B, arrowheads represent the air flows.

Thus, the interior of the enclosure 11 of the minienvironment device (11-15) is set as a local environment (minienvironment) where a cleanliness level is set higher than an ambient level (within the clean room) in order to conduct the liquid immersion observation of the substrate 10A in a clean environment. The intra-gas particles are removed by a ULPA (Ultra-Low Penetration Air) filter 17. An air space, in which the liquid immersion microscope 20 is disposed, of the interior of the enclosure 11, receives introduction of the clean air with chemical substances such as an organic series gas and an ammonia gas being removed by a chemical filter 18 of the fan filter unit 12 and is kept in an environment having a small amount of out-gas such as T.O.C (Total Organic Carbon). The liquid immersion microscope 20 includes a stage portion 21 sustaining the substrate 10A, an objective lens 22 of the liquid immersion system, a discharge nozzle 23 used for discharging the liquid (unillustrated) of the liquid immersion medium and a suction nozzle 24 employed for sucking the liquid. Further, though the illustration is omitted, the liquid immersion microscope 20 includes an illumination optical system, an auto-focus mechanism based on a TTL (Through-The-Lens) system and a control unit.

The stage portion 21 is constructed of an XY-stage and a Zθ-stage. The substrate 10A is carried from, e.g., a developing device, then placed on the upper surface of the Zθ-stage and fixedly supported by, e.g., vacuum adsorption. The Zθ-stage moves the substrate 10A in a perpendicular direction when focusing the substrate 10A. The focusing operation is conducted by the unillustrated control unit in a way that employs the auto-focus mechanism. Further, when positioning a predetermined observation point of the substrate 10A within a field-of-view of the objective lens 22, the XY-stage moves the substrate 10A within a horizontal plane. A base member of the XY-stage is fixed to a main body of the liquid immersion microscope 20.

The objective lens 22 of the liquid immersion system is fixed to the main body of the liquid immersion microscope 20 and is designed to, when a space between a front edge of the objective lens 22 and the substrate 10A is filled with a liquid 19 (FIG. 2) of a liquid immersion medium, correct an aberration of an optical system. The unillustrated illumination optical system is provided with an illuminating light source. An observation wavelength is in, e.g., a visible range and an ultraviolet range. In the case of the visible range, the liquid immersion observation of the substrate 10A, which uses an eyepiece, can be done. Moreover, in the case of the ultraviolet range, a visual observation being impossible, an image is captured by providing a CCD (Charge Coupled Device) camera as a substitute for the eyepiece and is displayed on a monitor device, thereby performing the liquid immersion observation.

The liquid 19 of the liquid immersion medium is, for example, pure water. A large quantity of pure water is easily available for a semiconductor manufacturing process, etc. Furthermore, the pure water does not adversely affect a photoresist of the substrate 10A, and hence a nondestructive inspection of the substrate 10A can be performed. Further, the pure water, which has no harmful influence on the environment and is extremely low of a content of impurity, can be therefore expected to have action for cleaning the surface of the substrate 10A. Note that the pure water used for the semiconductor manufacturing process is generally called [ultra pure water]. This is because of the ultra pure water having a higher purity than the generally-called [pure water] has. It is preferable that the first embodiment involves using the ultra pure water.

Figure 2:
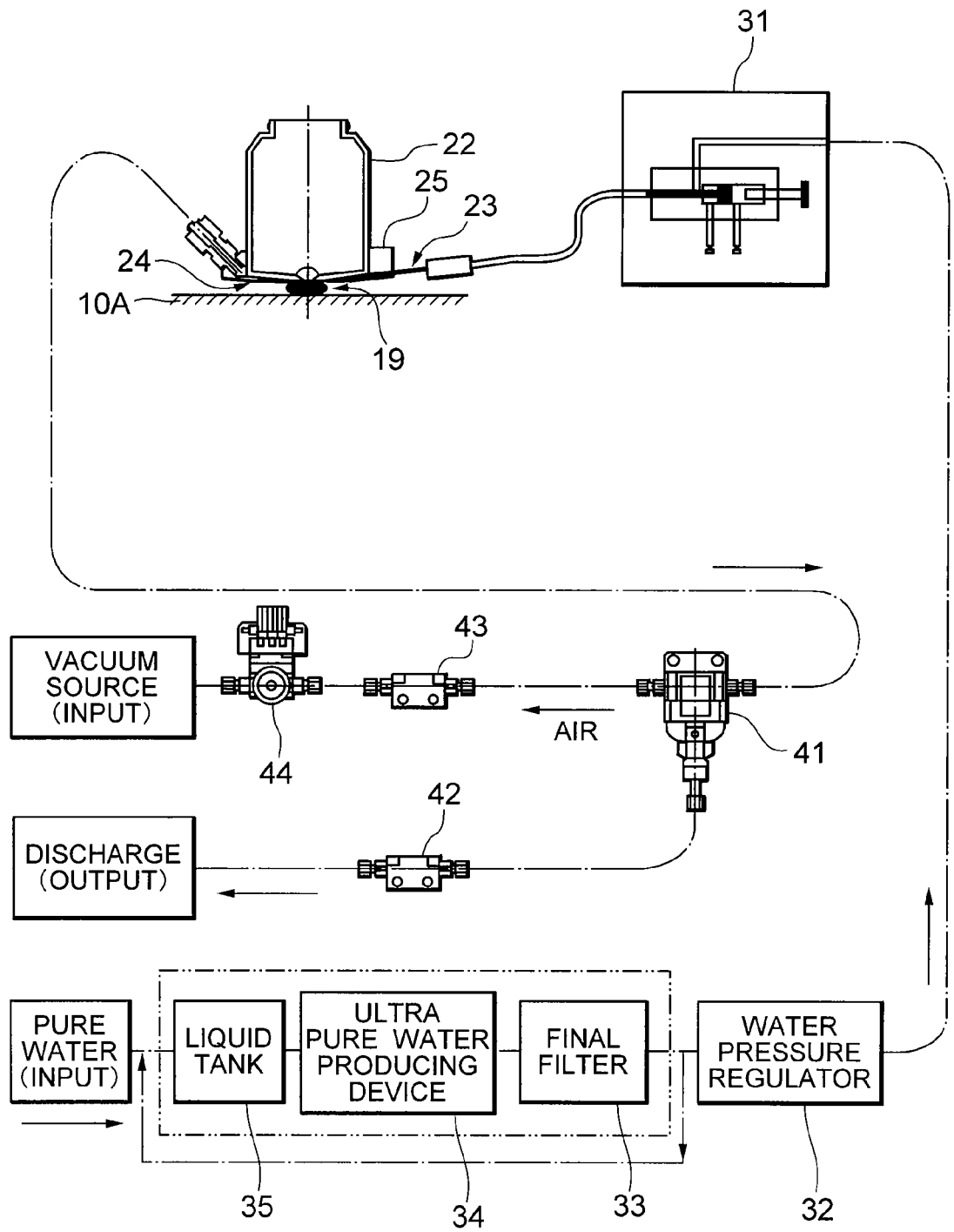
FIG. 2 is a view illustrating a construction of a liquid discharge device (31-35) connected to a discharge nozzle 23 and a construction of a liquid suction device (41-44) connected to a suction nozzle 24.

The discharge nozzle 23 is fixedly disposed in the periphery of the objective lens 22, and a tip of the discharge nozzle 23 is positioned in the vicinity of the front edge of the objective lens 22. The discharge nozzle 23 discharges a proper amount of liquid 19 to between the front edge of the objective lens 22 and the substrate 10A and is therefore the nozzle to which a liquid discharge device (31-35) is, as shown in FIG. 2, connected. The liquid discharge device (31-35) is constructed of a pressurizing pump 31, a water pressure regulator 32, a final filter 33, an ultra pure water producing device 34 and a liquid tank 35.

Further, the suction nozzle 24 is, in the same way as the discharge nozzle 23 is, fixedly disposed in the periphery of the objective lens 22, and a tip of the suction nozzle 24 is positioned in the vicinity of the front edge of the objective lens 22. The suction nozzle 24 sucks the liquid 19 from the substrate 10A and is therefore the nozzle to which a liquid suction device (41-44) is connected. The liquid suction device (41-44) is constructed of a filter 41 for collecting the liquid, electromagnetic valves 42, 43 and a vacuum regulator 44. A suction pump as a vacuum source is connected to the vacuum regulator 44.

Figure 3A:
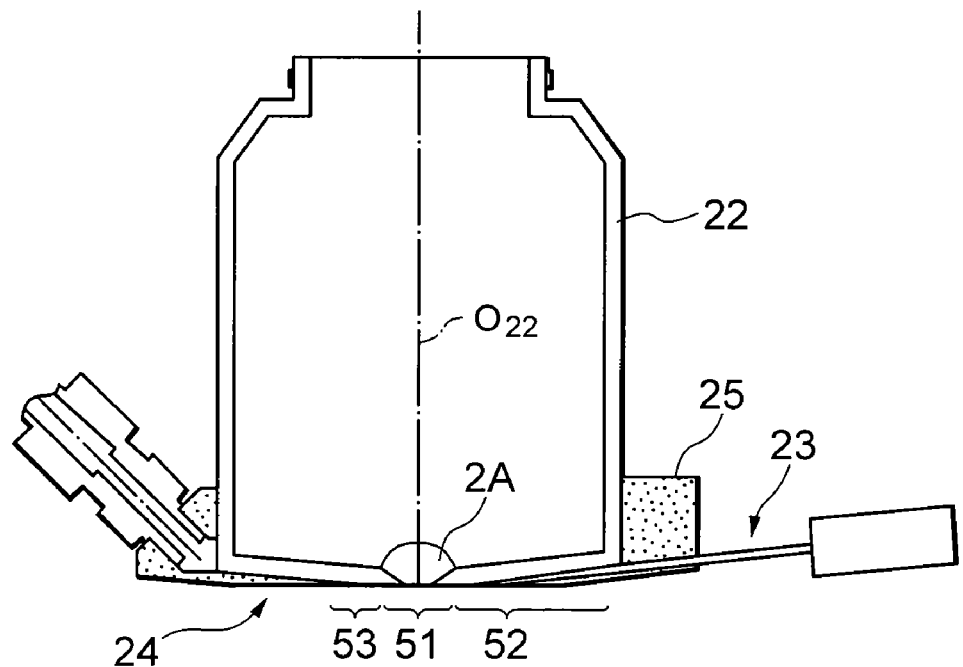
FIGS. 3A and 3B are explanatory enlarged views of a peripheral configuration of a front edge 51 of an objective lens 22.
Figure 3B:
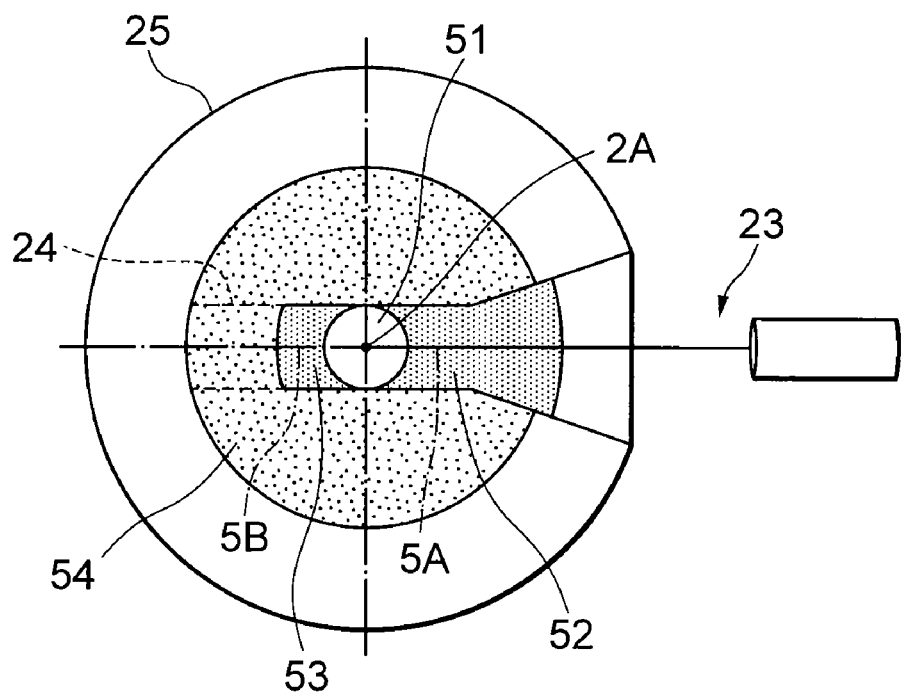

Moreover, in the microscope apparatus 10 according to the first embodiment, when making the observation based on the local liquid immersion, for supplying and collecting the liquid 19 at high efficiency, an adaptor 25 is integrally attached to the periphery of the front edge f the objective lens 22 and takes a configuration as illustrated in FIGS. 3A and 3B. FIG. 3A shows a sectional configuration of the adaptor 25 as viewed from sideway similarly to FIG. 2. FIG. 3A shows the section, with dot shading, of the adaptor 25. Further, FIG. 3B illustrates a configuration of the adaptor 25 as viewed from under.

A front edge 51 of the objective lens 22 takes a flat shape substantially vertical to an optical axis $O_{22}$ of the objective lens 22. Moreover, a front lens element 2A of the objective lens 22 is exposed at a central portion of the front edge 51.

Furthermore, the adaptor 25 is attached, whereby inclined faces 52, 53 are respectively provided in two portions adjacent to the front edge 51 in the periphery of the front edge 51 of the objective lens 22, and protruded portions 54 are provided in substantially U-shaped portions neighboring to the inclined faces 52, 53.

Figure 4:
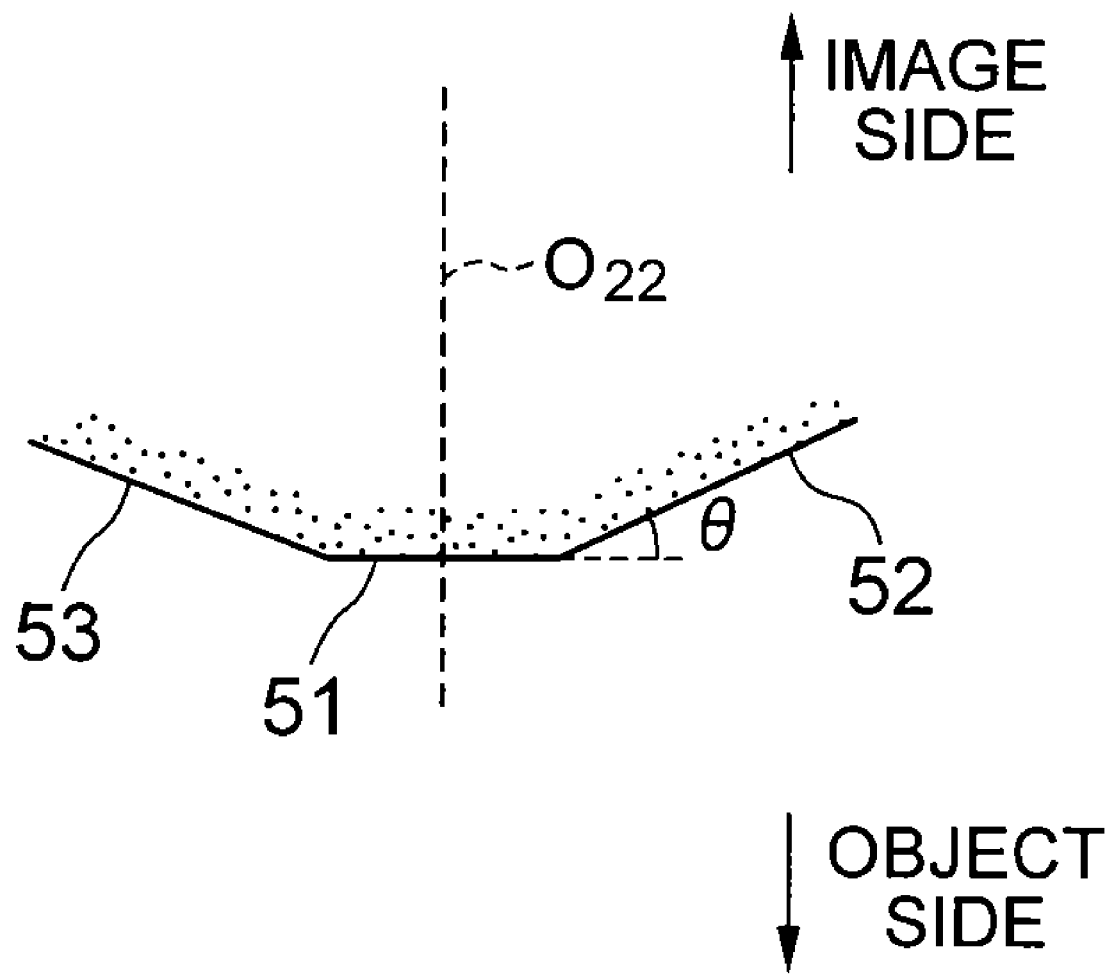
FIG. 4 is a view illustrating inclinations of inclined faces 52, 53 in exaggeration.
Figure 5A:
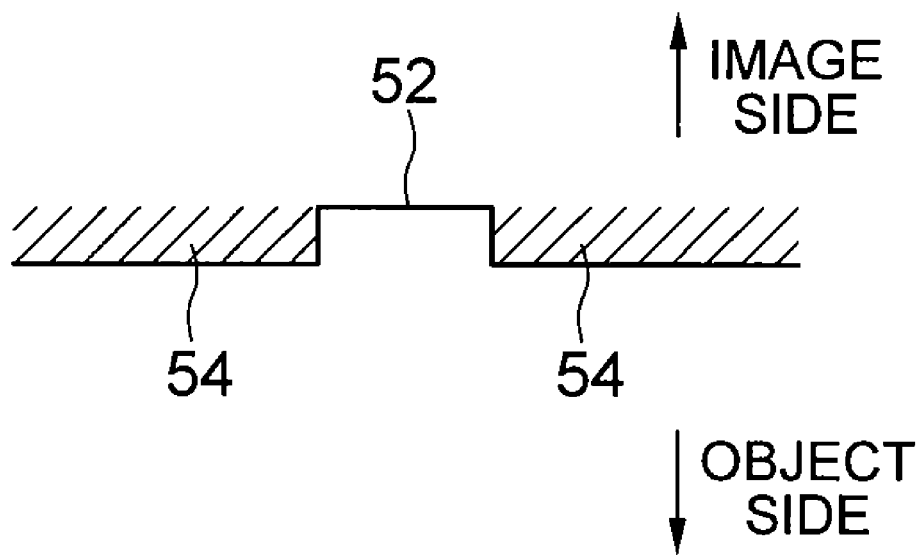
FIGS. 5A and 5B are explanatory views showing stepped portions of protruded portions 54 with respect to the inclined faces 52, 53.
Figure 5B:
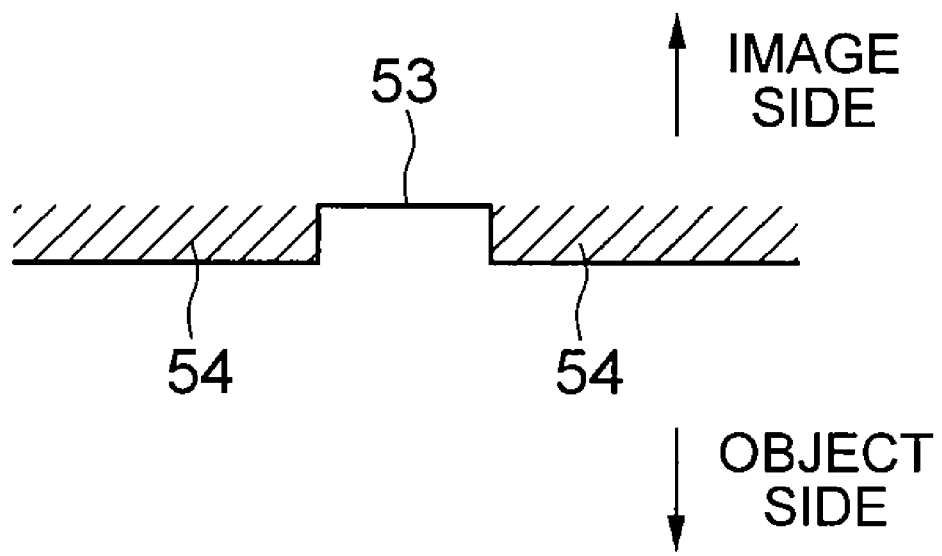

The inclined faces 52, 53 are, their central lines 5A, 5B being embraced by the same plane together with the optical axis $O_{22}$ of the objective lens 22, as understood from FIG. 4 showing the inclinations thereof in exaggeration, more inclined in a direction proximal to the image side of the objective lens 22 as getting farther away from the front edge 51. The protruded portions 54 are portions protruding on an object side of the objective lens 22 from the inclined faces 52, 53, and each take, as understood from FIGS. 5A and 5B showing a stepped portion thereof in exaggeration, a flat shape substantially vertical to the optical axis $O_{22}$ of the objective lens 22. The protruded portion 54 is embraced by the same plane as of the front edge 51.

Widths of the inclined faces 52, 53 are given as follows. Herein, the widths connote dimensions in the direction vertical to the plane embracing the central lines 5A, 5B of the inclined faces 52, 53 and the optical axis $O_{22}$ of the objective lens 22.

The width of one inclined face 52 is different in its inside portion extending at a predetermined distance from the front edge 51 and in its outside portion extending at a predetermined distance to the side face of the objective lens 22, wherein the width of the outside portion thereof is larger than the inside portion. Further, the width of the inside portion is substantially fixed irrespective of the distance from the front edge 51. The width of the outside portion becomes larger as getting farther away from the front edge 51. Namely, the outside portion takes a substantially fan-shape. By contrast, the width of the other inclined face 53 is substantially fixed throughout regardless of the distance from the front edge 51. Moreover, the width of the other inclined face 53 is substantially equal to the width of the inside portion of one inclined face 52.

Figure 6A:
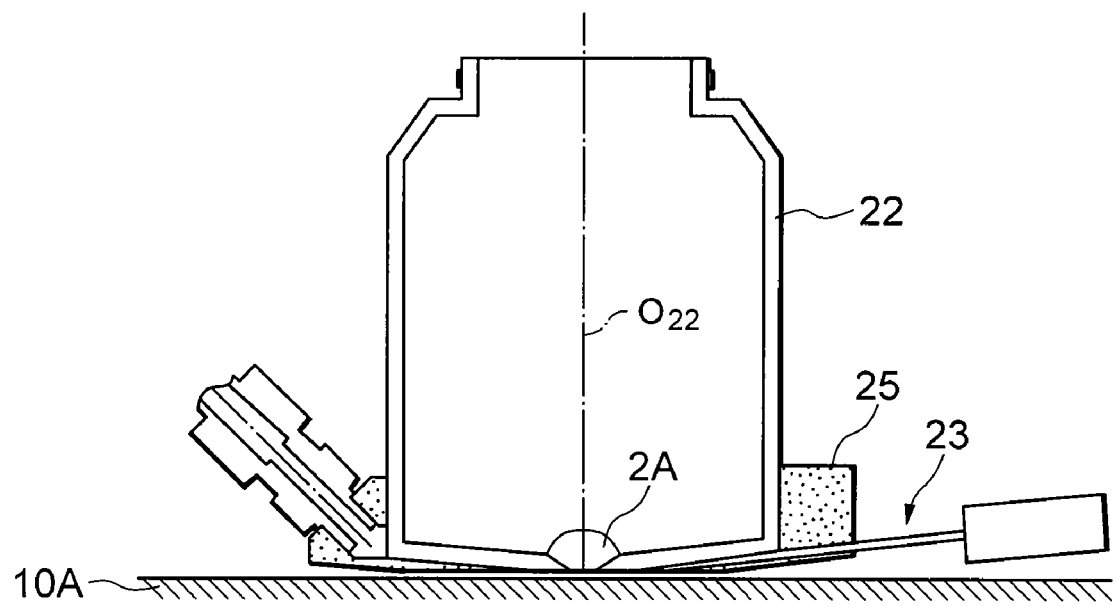
FIGS. 6A and 6B are explanatory views of an aperture portion 55 formed when establishing a face-to-face relationship with a substrate 10A.
Figure 6B:
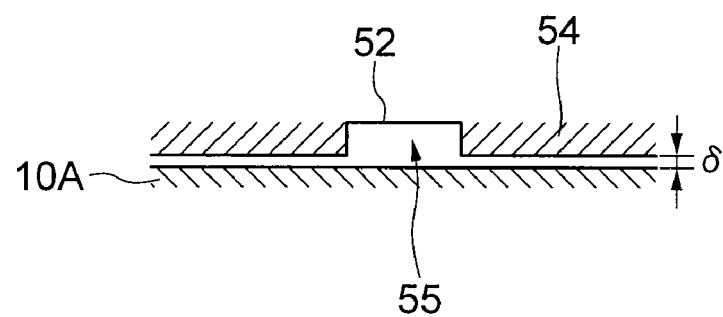

Furthermore, one inclined face 52 extends from the front edge 51 to the side face of the objective lens 22. Hence, when making the liquid immersion observation of the substrate 10A, if the observation point of the substrate 10A is positioned in the vicinity of the optical axis $O_{22}$ of the objective lens 22 and if the substrate 10A is set in a face-to-face relationship with the objective lens 22 and with the adaptor 25 (FIG. 6A), an aperture portion 55 surrounded by one inclined face 52 and the protruded portions 54 is, as illustrated in FIG. 6B, formed in the side face of the objective lens 22.

The aperture portion 55 functions as a vent hole for sucking the liquid 19 (FIG. 2) supplied to between the front edge 51 of the objective lens 22 and the substrate 10A in order to make the liquid immersion observation. On the occasion of the liquid immersion observation, the front edge 51 of the objective lens 22 (and the protruded portions 54) and the substrate 10A are kept substantially in parallel, and a gap δ therebetween is kept on the order of 0.05 mm-0.5 mm. FIG. 2 shows the gap 5 in the way of facilitating recognition of the illustration of the liquid 19, however, the actual gap δ is extremely narrow as in FIG. 6A.

The suction nozzle 24 used for sucking the liquid 19 is provided on the inclined face 53 on the opposite side to the aperture portion 55 (FIG. 3). Further, the suction nozzle 24 is inclined at the same angle as of the inclined face 53 and is disposed to extend smoothly from the inclined face 53.

Therefore, when sucking the liquid 19, the air taken in via the aperture portion 55, after flowing through between one inclined face 52 and the substrate 10A (FIG. 5A), flows through between the front edge 51 and the substrate 10A and further flows through the other inclined face 53 and the substrate 10A (FIG. 5B), thus being led to the suction nozzle 24.

Then, with this air flow, the liquid 19 is sucked. An air path extending from the aperture portion 55 to the suction nozzle 24 functions as a vacuum path when sucking the liquid 19 and further functions as a path for the liquid 19 (i.e., as a water path).

A sectional area of the path, which is different depending on positions, is largest at the aperture portion 55 and is smallest at the front edge 51.

Moreover, the sectional area of the path becomes smaller as getting closer to the front edge 51 along the inclined face 53 from the aperture portion 55 and becomes larger as getting closer to the suction nozzle 24 along the inclined face 52 from the front edge 51. Thus, since the sectional area of the path is set largest at the aperture portion 55, an aperture area of the vacuum path when sucking the liquid 19 becomes large, and a vacuum flow quantity gets easy to ensure.

Furthermore, according to the first embodiment, the width of the suction nozzle 24 is set substantially equal to the width of the inclined face 53 (FIG. 3B). In this case, the width of the suction nozzle 24 is also substantially equal to the width of the inside portion of the inclined face 52. Therefore, an effective sectional area of the vacuum path when sucking the liquid 19 gets substantially equal to the sectional area, at the front edge 51, of the path described above. Note that the width of the suction nozzle 24 (and the width of the inclined face 53) be, it is preferable, set equal to or larger than an optical effective diameter of the front lens element 2A of the objective lens 22.

Moreover, the first embodiment adopts the configuration, wherein the suction nozzle 24 has the large width, while the discharge nozzle 23 is extra fine. Namely, the discharge nozzle 23 is the extra fine tube member narrower than the suction nozzle 24, and an inside diameter Φ of the discharge nozzle 23 is on the order of 0.1 mm-1 mm. Further, the discharge nozzle 23 is provided within the inclined face 52 in the path described above, and the width of the discharge nozzle 23 is narrower than the inclined face 52.

When a plane vertical to the optical axis $O_{22}$ of the objective lens 22 is set as a reference plane, an angle θ (FIG. 4) of the inclined face 52 is set to an arbitrary angle within a range of, preferably, 5 degrees through 30 degrees and, more preferably, 5 degrees through 15 degrees. It is to be noted that the tip of the discharge nozzle 23 be, it is preferable, made proximal to the observation point of the substrate 10A to the greatest possible degree when performing the liquid immersion observation in a way that disposes the tip of the discharge nozzle 23 on the same plane as of the front edge 51 of the objective lens 22.

Further, according to the first embodiment, the tip of the discharge nozzle 23 and the tip of the suction nozzle 24 are disposed in the face-to-face relationship, with the front edge 51 of the objective lens 22 being interposed therebetween. The discharge nozzle 23 is, however, inclined at the same angle as the inclined face 52 is, and the suction nozzle 24 is also inclined at the same angle as the inclined face 53 is, so that, strictly speaking, an extension line of the central axis of the discharge nozzle 23 and an extension line of the central axis of the suction nozzle 24 are disposed so as to intersect each other on the optical axis $O_{22}$ of the objective lens 22. The respective central axes of the discharge nozzle 23 and of the suction nozzle 24 are embraced by the same plane together with the optical axis $O_{22}$ of the objective lens 22.

In the microscope apparatus 10 having the construction described above, in the liquid discharge device (31-35) in FIG. 2, the pure water is poured into the liquid tank 35, the pure water in the liquid tank 35 is pumped up by a pump of the ultra pure water producing device 34 and is, after purging the water of ions and sterilizing the water by killing bacteria, fed to the final filter 33. Then, after passing through the final filter 33, the ultra pure water meeting water quality specifications about particles etc is obtained. The ultra pure water is again fed to the liquid tank 35 during a period till a discharge command is issued from the unillustrated control unit, and is, it follows, circulated between the ultra pure water producing device 34 and the final filter 33. The circulation is controlled by a timer.

Then, when the discharge command is issued from the unillustrated control unit, the ultra pure water fed from the final filter 33 is supplied to the pressurizing pump 31 with water pressure controlled by the water pressure regulator 32, and is discharged as the liquid 19 of the liquid immersion medium to the observation point of the substrate 10A via the discharge nozzle 23 from the pressurizing pump 31.

When discharging the liquid 19, the gap 5 between the front edge of the objective lens 22 and the substrate 10A is kept on the order of 0.05 mm-0.5 mm. FIG. 2 shows a heightwise direction of the liquid 19 in enlargement for facilitating the recognition, however, the actual height of the liquid 19 is extremely small corresponding to the gap 5 and comes within the gap 5 as in FIGS. 6A and 6B.

The ultra pure water in the liquid tank 35 is used as the liquid 19 of the liquid immersion medium, when the liquid tank 35 gets close to emptiness, this is detected by an unillustrated sensor, and fresh pure water is automatically poured into the liquid tank 35.

A quantity of the liquid 19 discharged from the discharge nozzle 23 (which will hereinafter be termed a [discharge liquid quantity]) by one discharging operation employing the liquid discharge device (31-35), is determined by a product of a discharge flow rate and a period of discharging time. Further, the discharge flow rate is determined by a product of an inside diameter sectional area of the discharge nozzle 23 and a discharging velocity. The inside diameter sectional area of the discharge nozzle 23 is already known. Accordingly, it follows that a one-time discharge liquid quantity via the discharge nozzle 23 is determined by a product of the discharging velocity and the discharging time.

Moreover, in the case of employing the extra fine discharge nozzle 23 as used in the first embodiment, a discharging velocity v (m/s) of the liquid 19 is, since a term of the inside diameter sectional area of the discharge nozzle 23 becomes approximately "0" from the Bernoulli's theorem, expressed by the following formula (1) by use of a water density ρ at 23° C. (ρ=997.54 (kg/m³), a water pressure ΔP (Pa), an acceleration-of-gravity g (g=9.8 (m/s²) and a water level difference Δz (m).

$$v=\sqrt{(2/\rho \cdot \Delta P+2 \cdot g \cdot \Delta z)} \tag{1}$$

Then, supposing that the water level difference Δz=0, it follows that the discharging velocity v is determined by the water pressure ΔP. Accordingly, the one-time discharge liquid quantity via the discharge nozzle 23 is determined by the product of the water pressure ΔP and the discharging time, and can be controlled by adjusting a stroke of the pressurizing pump 31.

The water pressure ΔP is set preferably such as ΔP=0.01 MPa-0.1 MPa when taking account of a loss in the gap between the front edge of the objective lens 22 and the substrate 10A. In this case, the discharging velocity is given by v=approximately 4.5 m/s-14.2 m/s. If the water pressure ΔP (the discharging velocity v) is set substantially fixed, the one-time discharge liquid quantity via the discharge nozzle 23 can be controlled based on the discharging time.

According to the first embodiment, the inclined face 52 is provided in the periphery of the front edge 51 of the objective lens 22, the inclined face 52 is provided with the discharge nozzle 23, the liquid 19 is discharged by employing this discharge nozzle 23, and hence the liquid 19 can be properly discharged so as to come within between the front edge 51 of the objective lens 22 and the substrate 10A (i.e., the portion, having the minimum sectional area, of the path described above) (within the effective sectional area of the vacuum path when sucking the liquid 19). Moreover, the discharge nozzle having the width narrower than the inclined face 52 is used as the discharge nozzle 23, and therefore the fine adjustment of the discharge liquid quantity of the liquid 19 can be facilitated. Accordingly, the liquid 19 can be highly efficiently supplied when making the observation based on the local liquid immersion.

Further, in the liquid suction device (41-44), the vacuum regulator 44 is connected to the suction pump of the vacuum source, a start of sucking the liquid 19 is triggered by opening the electromagnetic valve 43. At this time, the path described above functions as the vacuum path, and the liquid 19 is led via the path to the suction nozzle 24 together with the flow of the air taken in from the aperture portion 55. Then, the liquid 19 sucked by the suction nozzle 24 is selected separately from the air via the liquid collection filter 41 and is thus discharged through the electromagnetic valve 42. Note that a loss of the path arrangement be, it is preferable, reduced by increasing a diameter and decreasing a length of the vacuum path extending from the suction nozzle 24 to the suction pump in order to ensure the sufficient vacuum flow rate along the path described above.

According to the first embodiment, the inclined faces 52, 53 are provided in the periphery of the front edge 51 of the objective lens 22, the protruded portions 54 are provided adjacent to the inclined faces 52, 53, further, the aperture portion 55 is formed along the extension line of one inclined face 52, the other inclined face 53 is provided with the suction nozzle 24, the suction nozzle 24 is set larger in width than the discharge nozzle 23, and the liquid 19 is sucked while taking in the air from the aperture portion 55 by use of the suction nozzle 24 and can be therefore collected at the high efficiency when making the observation based on the local liquid immersion.

Thus, according to the microscope apparatus 10 in the first embodiment, the liquid 19 can be highly efficiently supplied and collected when making the observation based on the local liquid immersion, and hence the liquid immersion observation of the substrate 10A can be conducted with a high throughput. Moreover, the liquid 19 after the liquid immersion observation can be collected quickly from the substrate 10A, thereby enabling such problems to be avoided that the particles (e.g., a particle size is equal to or smaller than 0.1 μm) floating in the gas is adhered to the liquid 19 with the result that the substrate 10A is contaminated and that the substrate 10A is oxidized by the liquid 19, and also enabling the microscope apparatus 10 to surely have flexibility to the micronization of the pattern.

Moreover, according to the first embodiment, the width of the inside portion of one inclined face 52 and the width of the other inclined face 53 are set substantially fixed irrespective of the distance from the front edge 51 and set substantially equalized to each other, so that the air flow between the front edge 51 of the objective lens 22 and the substrate 10A can be substantially uniformed within each section, and the liquid 19 can be highly efficiently sucked together with the uniform air flow.

Furthermore, according to the first embodiment, the width of the outside portion of the inclined face 52 is made larger than the inside portion thereof, whereby the aperture area of the vacuum path for sucking the liquid 19 is increased and the vacuum flow rate gets easy to ensure. Consequently, the liquid 19 can be sucked at the high efficiency by increasing the vacuum flow rate.

Further, according to the first embodiment, the outside portion of the inclined face 52 is formed in the fan shape, and the width thereof is set larger as getting farther away from the front edge 51, thereby enabling the air taken in from the aperture portion 55 to be led into the interior of the path described above and the liquid 19 to be sucked at the high efficiency together with this air flow.

Figure 7A:
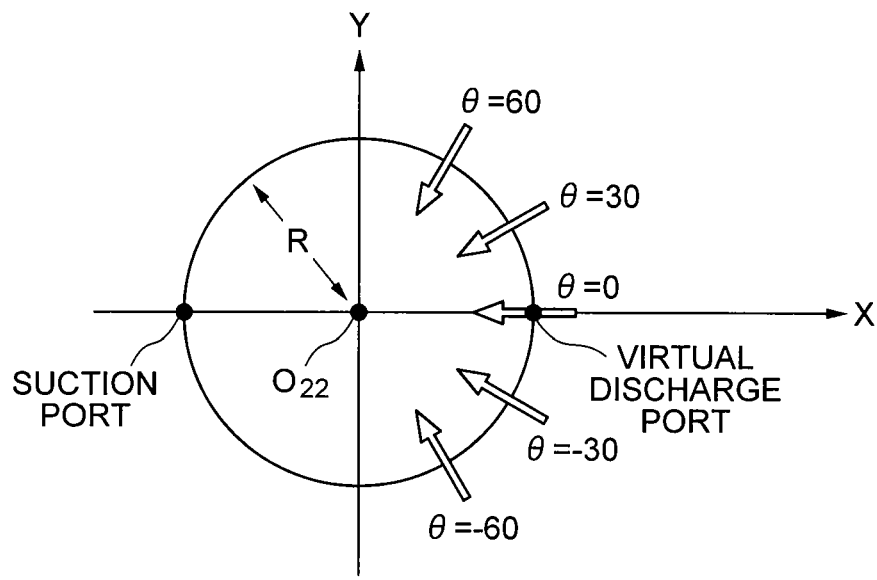
FIGS. 7A and 7B are views each showing a result of calculation about a flow velocity distribution on a circumference.
Figure 7B:
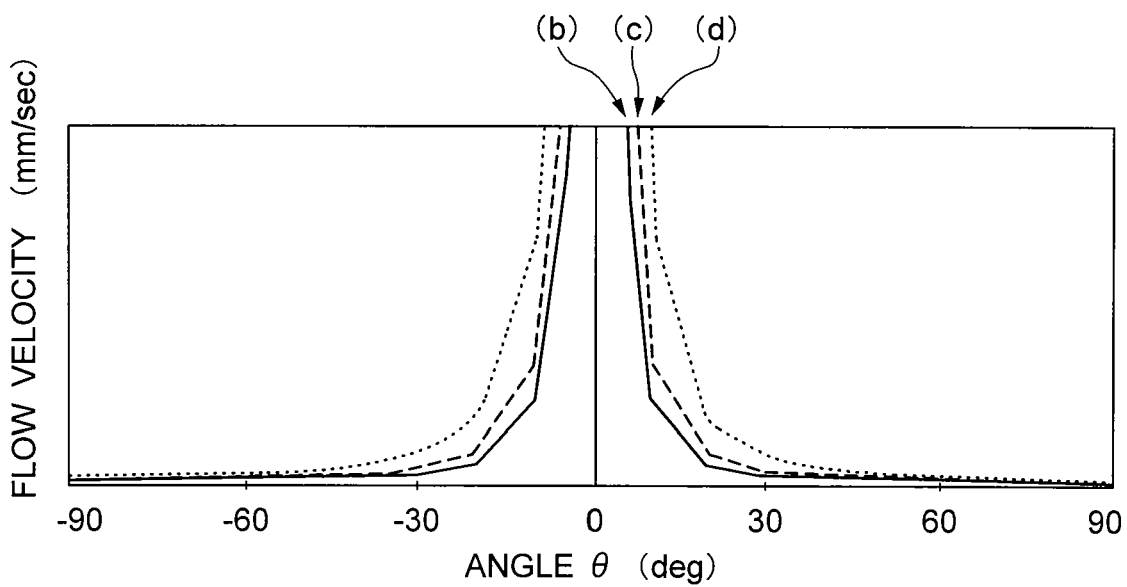

In this case, when assuming a circle having a radius R=19.5 mm about the optical axis $O_{22}$ of the objective lens 22 (FIG. 7A), a flow velocity distribution along the circumference becomes as shown in, e.g., FIG. 7B. According to the calculations, an interval h between the front edge 51 of the objective lens 22 and the substrate 10A is set to 0.5 mm (h=0.5 mm), a suction intensity m is set to 5305 mm$^2$/sec (m=5305 mm$^2$/sec), and a flow rate Q is set to 16667 m/sec (Q=16667 mm$^3$/sec). As understood from a curve (b) in FIG. 7B, the flow in the circumferential direction disperses in velocity at an angle θ=0°, and the flow vertical to the Y-axis within the path takes a maximum value when Y=0 (i.e., on the central line passing through the optical axis $O_{22}$). Further, when assuming a circle having a radius R=13 mm, a result of the calculation is plotted by a curve (c) in FIG. 7B, and when assuming a circle having a radius R=6.5 mm, a result of the calculation is plotted by a curve (d) in FIG. 7B.

Moreover, according to the first embodiment, the width of the suction nozzle 24 (FIG. 3B) is substantially equal to the width of the inclined face 53 and the width of the inside portion of the inclined face 52, and therefore the effective sectional area of the vacuum path for sucking the liquid 19 becomes substantially equal to the sectional area, at the front edge 51, of the path described above. Hence, when properly discharging the liquid 19 so as to come within between the front edge 51 and the substrate 10A, the liquid 19 can be surely sucked by the suction nozzle 24. Even when a rugged pattern is formed on the surface of the substrate 10A, the liquid 19 used for the observation can be certainly sucked with no residual of the liquid 19 in the recessed portion.

Further, according to the first embodiment, the respective central axes of the discharge nozzle 23 and of the suction nozzle 24 are disposed to be embraced by the same plane together with the optical axis $O_{22}$ of the objective lens 22, and hence the liquid 19 can be discharged directly toward the vicinity of the intersection (which is namely the vicinity of the center of the path described above) between the optical axis $O_{22}$ of the objective lens 22 and the substrate 10A. Accordingly, the liquid immersion observation can be quickly conducted immediately after the discharge, and the liquid 19 can be collected at much higher efficiency.

Furthermore, according to the first embodiment, the protruded portion 54 peripheral to the front edge 51 of the objective lens 22 takes the flat shape substantially vertical to the optical axis $O_{22}$ of the objective lens 22, so that air resistance outside the path (from the ambient) can be increased when sucking the liquid 19. It is therefore feasible to suck the liquid 19 by leading the air taken in from the aperture portion 55 to the suction nozzle 24 while restraining the air flow from the ambient.

Figure 8A:
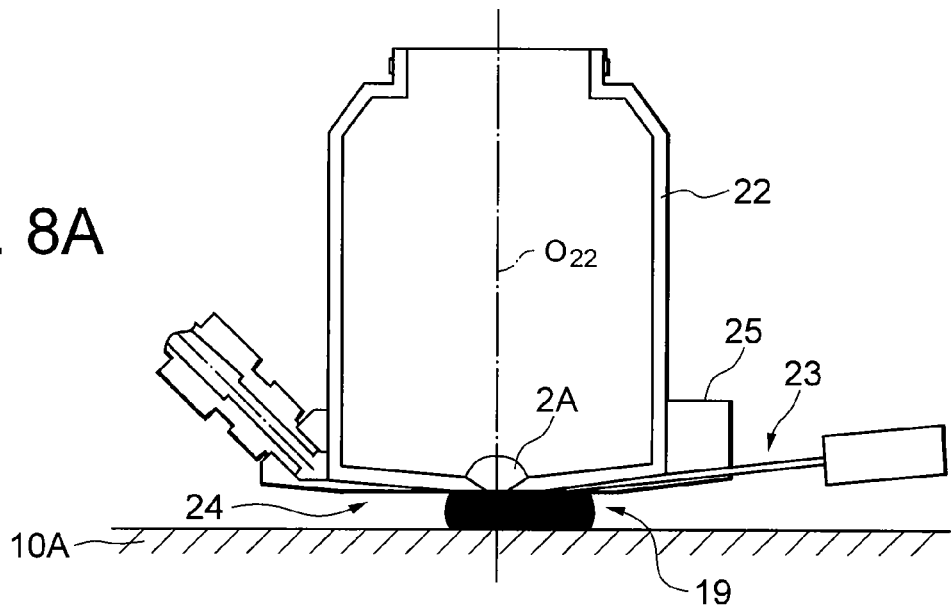
FIGS. 8A, 8B and 8C illustrate one example of a rough shape of a liquid 19 immediately after being discharged and are a side sectional view, a bottom view and a partially enlarged view, respectively.
Figure 8B:
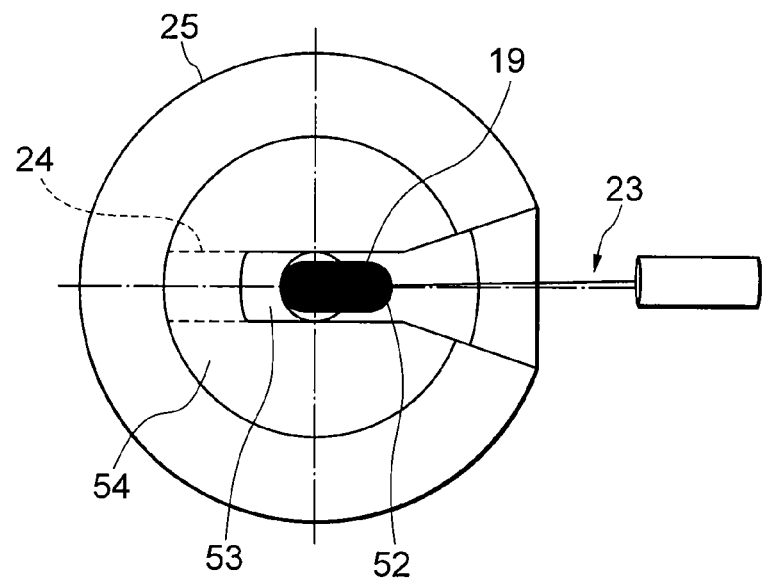
Figure 8C:
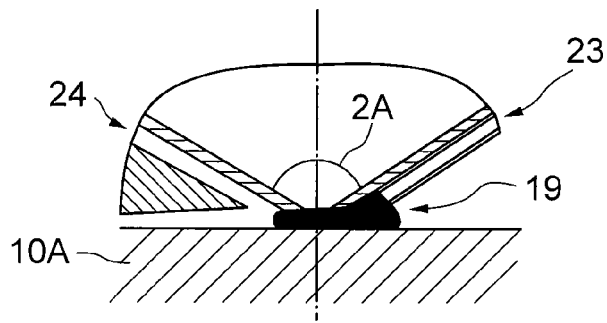

Further, in the microscope apparatus 10 according to the first embodiment, it is preferable that the discharge of the liquid 19 be finished in a state where the liquid 19 immediately after being discharged has, as illustrated in FIGS. 8A-8C, continuity to the tip of the discharge nozzle 23 in a way that controls the pressure and the flow rate when discharging the liquid 19 from the discharge nozzle 23. FIG. 8A is a side view similar to FIG. 2, FIG. 8B is a view as viewed from under, and FIG. 8C is a side view showing the discharge nozzle 23 and the suction nozzle 24 in enlargement.

Thus, the liquid 19 immediately after the discharge is treated as one bulk, then discharged so as to come within the effective sectional area of the path described above, and made to have the continuity to the tip of the discharge nozzle 23, whereby the liquid 19 kept in the near state to one bulk (i.e., while avoiding a situation that the liquid 19 remains in a sliced state) can be surely sucked by eliminating the gap between the liquid 19 and a theoretical path wall within the vacuum path for sucking the liquid 19. At this time, it is preferable to suck the liquid 19 instantaneously by turning ON/OFF the vacuum pressure with the electromagnetic valve 43.

Note that if the liquid immersion observation is conducted after discharging the liquid 19, the liquid (a liquid droplet) gradually deforms toward a stabilizing form in a relationship of a surface tension depending on materials of the objective lens 22 and of the substrate 10A. Further, if the objective lens 22 or the substrate 10A is made from the material exhibiting the small surface tension (the material, having a small contact angle, to which the liquid 19 is easy to adhere), it might happen that the liquid 19 is separated from the discharge nozzle 23 as the time elapses. The liquid 19 is, however, kept in the one-bulk state and can be therefore surely sucked.

Figure 9A:
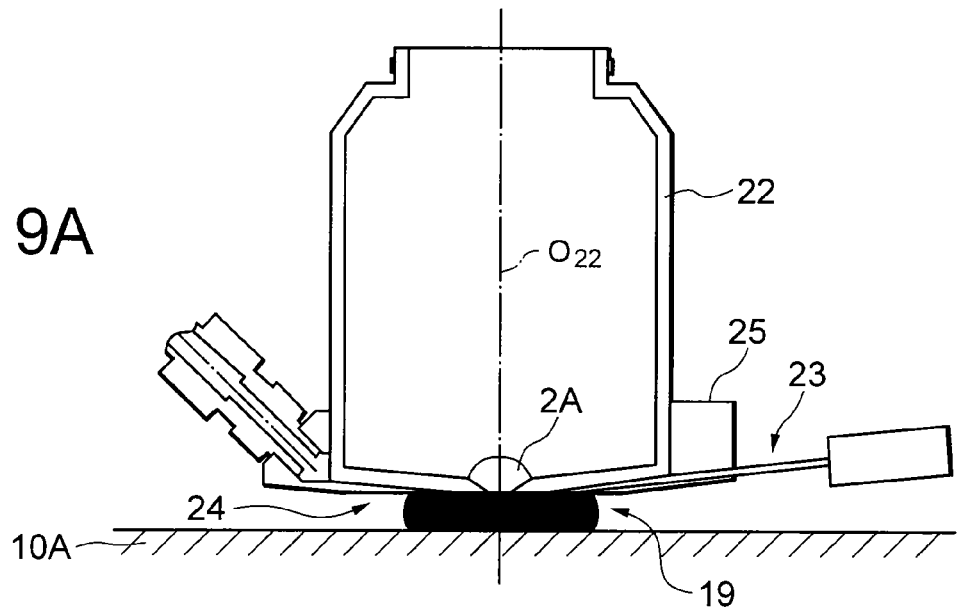
FIGS. 9A, 9B and 9C illustrate another example of the rough shape of the liquid 19 immediately after being discharged and are views similar to FIGS. 8A, 8B and 8C.
Figure 9B:
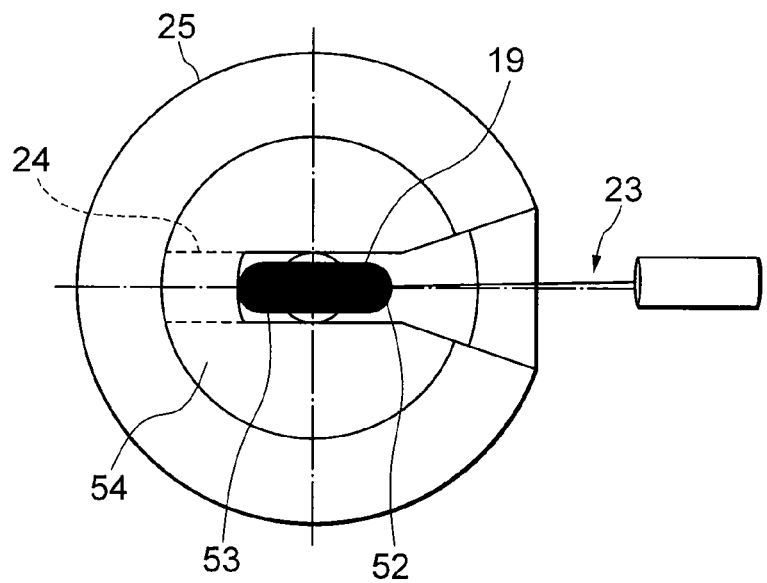
Figure 9C:
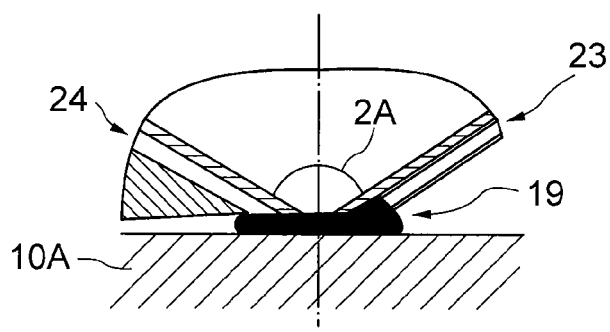

Moreover, in the microscope apparatus 10 according to the first embodiment, the pressure and the flow rate when discharging the liquid 19 from the discharge nozzle 23 are controlled, and, as shown in FIGS. 9A-9C, the discharge of the liquid 19 may also be finished in the state where the liquid 19 immediately after being discharged has the continuity to each of the tips of the discharge nozzle 23 and of the suction nozzle 24. In this case also, the liquid 19 immediately after the discharge is treated as one bulk, then discharged so as to come within the effective sectional area of the path described above, and made to have the continuity to the tips of the discharge nozzle 23 and of the suction nozzle 24, whereby the liquid 19 kept in the near state to one bulk (i.e., while avoiding the situation that the liquid 19 remains in the sliced state) can be surely sucked.

Figure 10A:
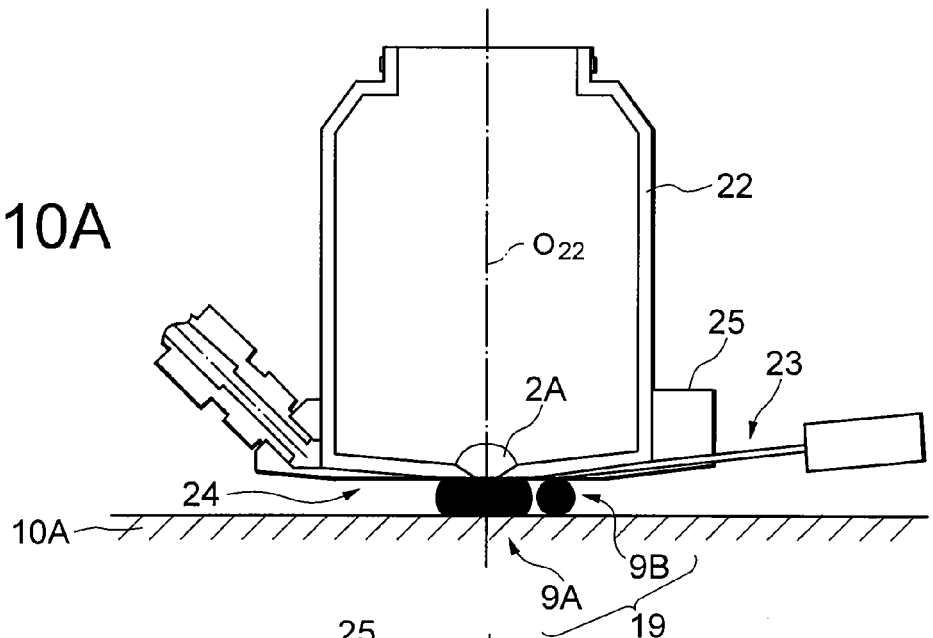
FIGS. 10A, 10B and 10C illustrate a case of separating the liquid immediately after being discharged into two bulks and are views similar to FIGS. 8A, 8B and 8C.
Figure 10B:
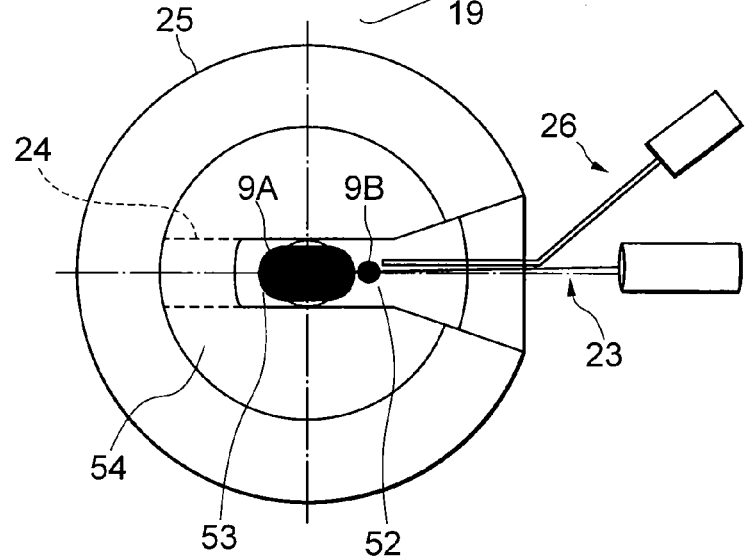
Figure 10C:
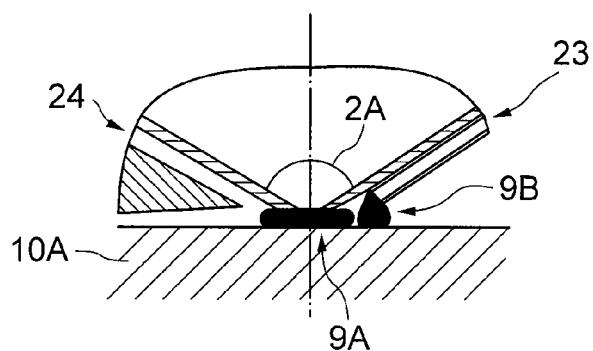

Depending on a relationship between the gap 6 between the front edge 51 of the objective lens 22 and the substrate 10A, the position of the discharge nozzle 23 and the discharge liquid quantity (the discharging time and the water pressure) of the liquid 19, however, as illustrated in FIGS. 10A-10C, the liquid 19 immediately after being discharged might be separated into two bulks (droplets) without becoming one bulk. This is because small quantities of liquid droplets are consecutively discharged due to the discharge nozzle 23 being extra fine even by controlling the completion of the discharge. If the liquid 19 is separated into two droplets 9A, 9B, the droplet 9A proximal to the suction nozzle 24 can be sucked by the suction nozzle 24, however, the other droplet 9B has a possibility of being disabled to be sucked but left there. The reason is that the air suction starts from both sides of the droplet 9B.

Such being the case, as shown in FIG. 10B, it is preferable that an extra fine suction nozzle 26 be provided in the vicinity of the discharge nozzle 23. In this case, after part (the droplet 9A) of the liquid 19 has been sucked by use of the large-width suction nozzle 24, the remainder (the droplet 9B) of the liquid 19 is sucked by the extra fine suction nozzle 26. The remaining droplet 9B gets continuous to the tip of the discharge nozzle 23 in many cases and can be therefore sucked surely by the extra fine suction nozzle 26. With this contrivance, both of the droplets 9A and 9B can be sucked.

Moreover, if the surface tension (the contact angle) differs depending on the material of the substrate 10A, it is preferable that physical property information (such as the contact angle, the surface tension and the material) of the substrate 10A be previously registered as a recipe, and that the discharge quantity of the liquid 19 be determined corresponding to the physical property information. This contrivance enables, even in the case of carrying out the liquid immersion observation of the substrates 10A made from different materials, the proper quantity of liquid 19 corresponding to the material to be automatically discharged within the effective sectional area of the path described above.

Modified Example of First Embodiment

It should be noted that the first embodiment discussed above has exemplified the configuration that the inclined face 52 is provided in the periphery of the front edge 51 of the objective lens 22 and the outside portion thereof is formed in the fan-shape, however, the present invention is not limited to this configuration. The width of the inclined face 52 may be set substantially fixed from the front edge 51 to the side face throughout irrespective of the inside portion and the outside portion. In this case also, the sectional area of the aperture portion 55 of the path described above can be ensured larger than the sectional area at the front edge 51, thereby performing the efficient suction.

Further, the first embodiment discussed above has exemplified the configuration that the protruded portion 54 is provided in the periphery of the front edge 51 of the objective lens 22 and is embraced by the same plane as of the front edge 51, however, the present invention is not limited to this configuration. The protruded portion 54 may also be protruded on the object side of the objective lens 22 from the front edge 51.

Moreover, the first embodiment discussed above has exemplified the configuration that the protruded portion 54 takes the flat shape substantially vertical to the optical axis $O_{22}$ of the objective lens 22 in order to increase the air resistance other than in the path described above (from the ambient) when sucking the liquid 19, however, the present invention is not limited to this configuration. Even when the protruded portion 54 has an inclination and if the inclined angle thereof is gentler than the angle θ (FIG. 4) of each of the inclined faces 52, 53, the same effect as the above can be acquired. If the basis of the inclined angle of the protruded portion 54 is set to the plane vertical to the optical axis $O_{22}$ of the objective lens 22, the angle is preferably set to an arbitrary angle of, e.g., 0 degree through 1 degree and more preferably set approximate to 0 degree infinitesimally.

Second Embodiment

Figure 11:
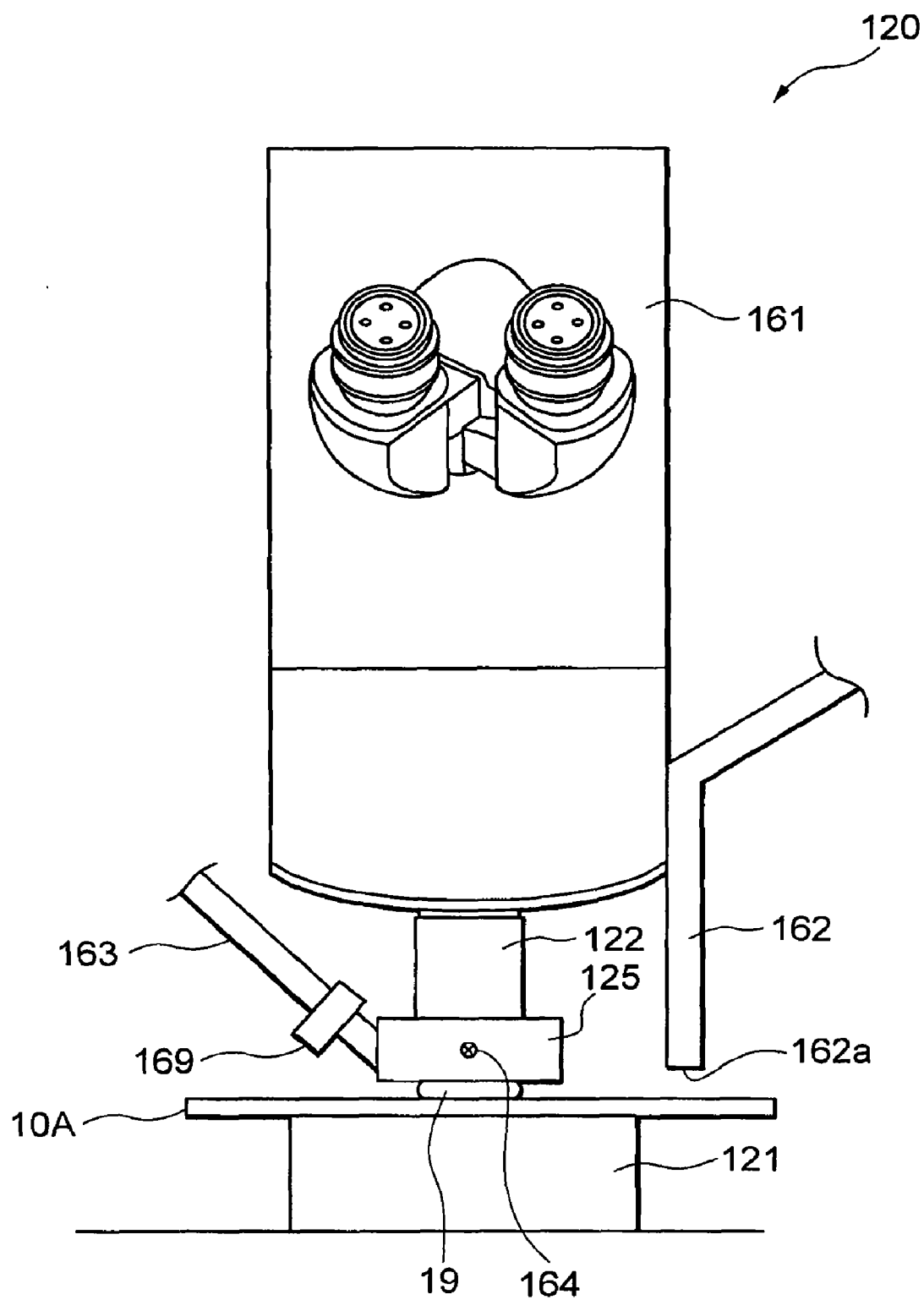
FIG. 11 is a view of a construction of a liquid immersion microscope in the microscope apparatus in a second embodiment of the present invention.

FIG. 11 is a view showing a construction of a liquid immersion microscope 120 in a second embodiment of the present invention. The second embodiment has variations of the construction of the liquid immersion microscope 20 and of the construction of the adaptor 25 in the first embodiment illustrated in FIGS. 1A and 1B. In FIG. 11, the substrate 10A to be inspected is placed on a stage portion 121 and is observed by an eyepiece 161 or an unillustrated imaging device by use of an objective lens 122. The substrate 10A to be inspected is automatically placed on the stage portion 121 by the carrying mechanism 16 in FIG. 1B.

An adaptor 125 is provided between the objective lens 122 and the substrate 10A. The adaptor 125 is fixed to the objective lens 122 by three pieces of fixing screws 164 (only one screw is illustrated) disposed in three directions. One end of a liquid collection tube 163 is connected via a joint 169 to the adaptor 125, and the other end of the liquid collection tube 163 is connected to the liquid suction device (41-44) in FIG. 2.

A liquid supply tube 162 for supplying the liquid 19 to the substrate 10A is disposed sideway of the objective lens 122. A front end portion 162a of the liquid supply tube 162 is so disposed as to be directed toward the substrate 10A. The other end of the liquid supply tube 162 is connected to the liquid discharge device (31-35).

In the second embodiment, to begin with, an observation portion of the substrate 10A is moved to under the front end portion 162a of the liquid supply tube 162 by moving the stage portion 121. Then, the liquid discharge device (31-35) supplies the liquid, and the liquid 19 is dropped down to the observation portion of the substrate 10A from the front end portion 162a of the liquid supply tube 162. Thereafter, the observation portion to which the liquid 19 has been dropped down is moved to under the objective lens 122 by moving the stage portion 121, and a space between the observation portion of the substrate 10A and the objective lens 122 is filled with the dropped liquid. Thus, the observation portion of the substrate 10A is moved to within the field of view of the objective lens 122.

Figure 12:
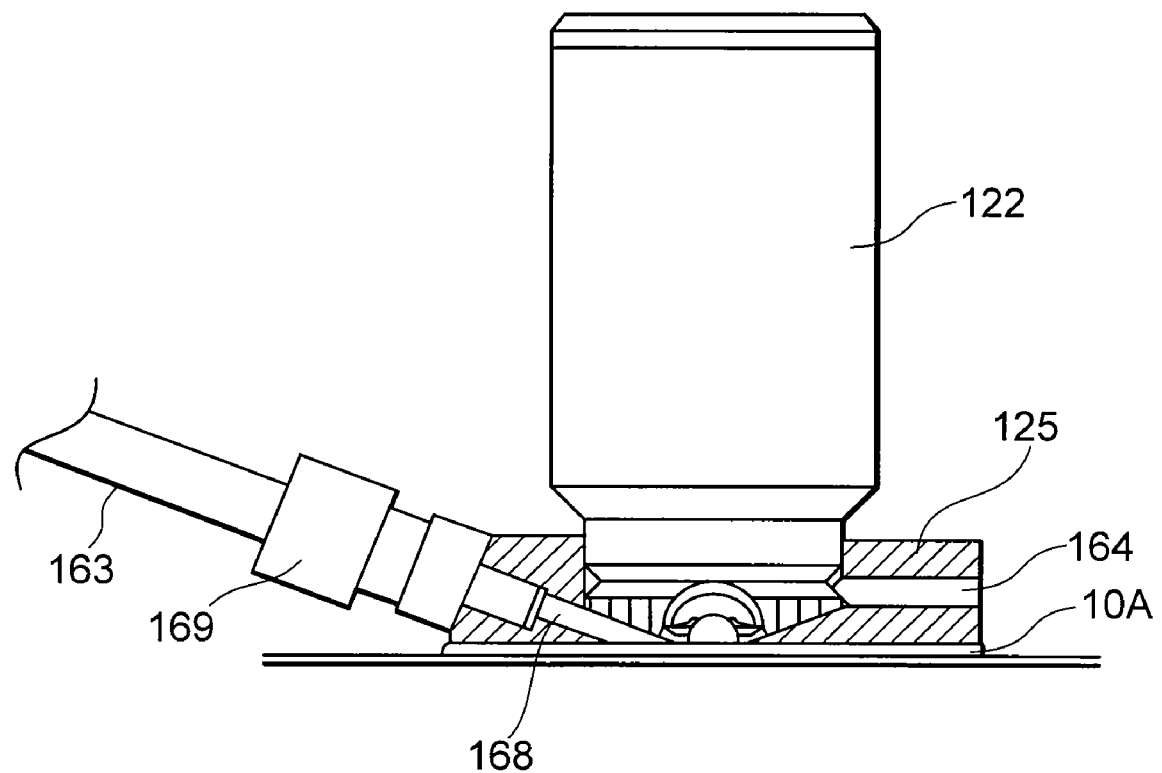
FIG. 12 a sectional view showing a state of attaching an adaptor 125 to an objective lens 122.

FIG. 12 is a sectional view showing a state of attaching the adaptor 125 to the objective lens 122. The adaptor 125 is fixed to the objective lens 122 by the three fixing screws 164 disposed in the three directions centered at the objective lens 122. The objective lens 122 is constructed by disposing a plurality of glass lens elements in a metal frame in the same way as in the case of the liquid immersion objective lens used for observing a living thing, wherein only the front lens element for observing the substrate 10A is exposed.

Figure 13:
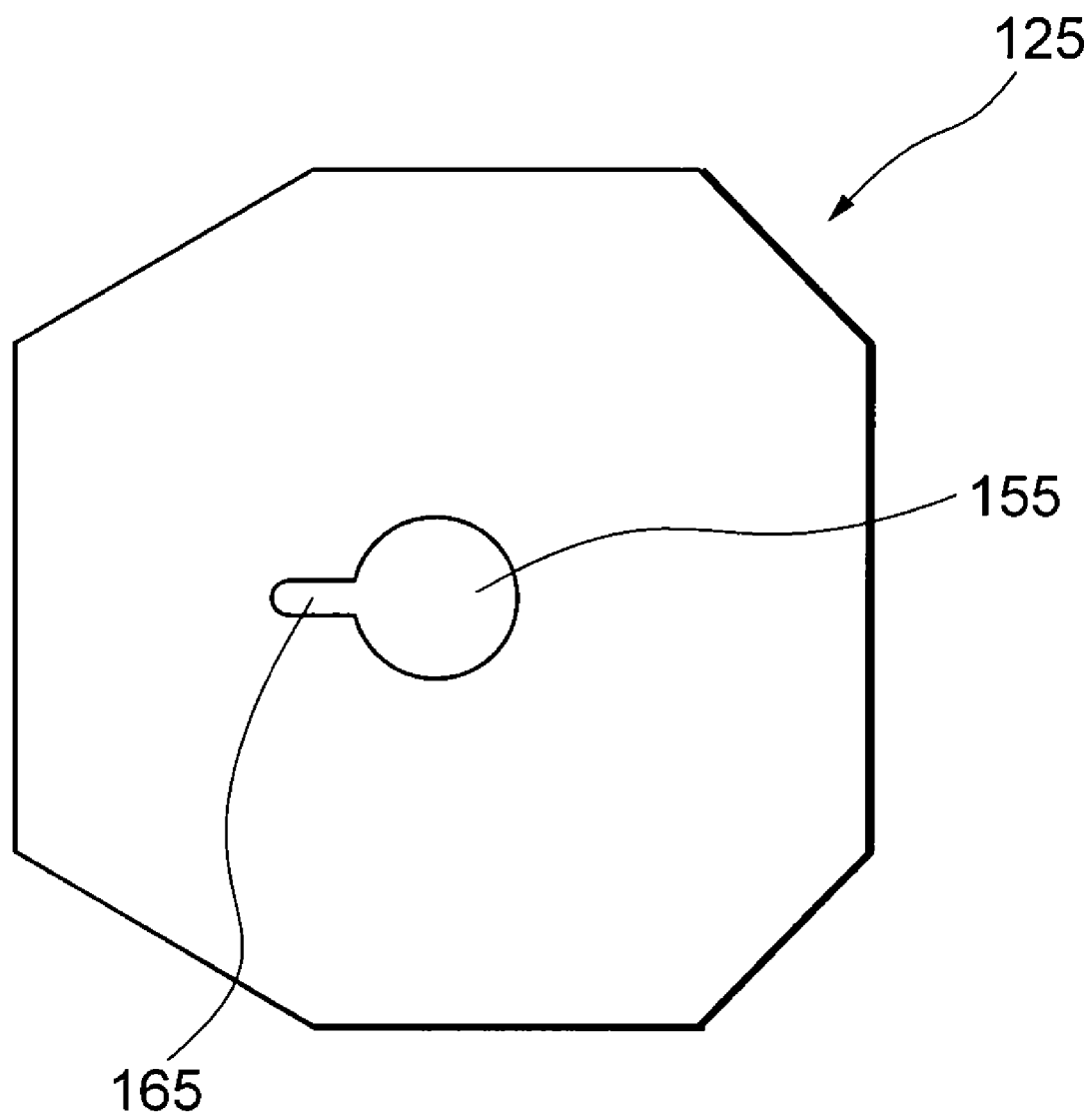
FIG. 13 is a view of the adaptor 125 as viewed from a bottom face.

FIG. 13 is a view of the adaptor 125 as viewed from a bottom face (on the side of the substrate 10A). The adaptor 125 is formed at the center with an aperture portion 155 for the observation through the objective lens 122, wherein the substrate 10A is observed by a microscope apparatus 120 through the aperture portion 155. The adaptor 125 is connected to the objective lens 122 so that the center of the aperture portion 155 is substantially coincident with the optical axis of the objective lens 122. When observing, the space between the front lens element of the objective lens 122 and the substrate 10A is filled with the liquid, and the observation with a high resolution using the liquid immersion objective lens is conducted.

The aperture portion 155 is further formed with a recessed portion 165 in the surface on the side of the substrate 10A. The recessed portion 165 leads to a liquid suction path 168 provided inside the adaptor 125, and the liquid suction path 168 is connected to the liquid collection tube 163 via the joint 169.

A slight gap exists between the bottom face of the adaptor 125 and the substrate 10A, after finishing the observation, and the liquid staying between the front edge of the objective lens 122 and the substrate 10A is sucked by the liquid suction device (41-44) through the liquid suction path 168 and the liquid collection tube 163 and is then eliminated. The liquid can be therefore eliminated soon after finishing the observation by providing the adaptor 125 according to the second embodiment. As a period of time for which the front lens element of the objective lens 122 or the substrate 10A comes into contact with the liquid is longer, the front lens element of the objective lens 122 or the substrate 10A gets easier contaminated, however, a contaminant occurrence range is within an area of the aperture portion 155, and further, the liquid can be quickly collected via the liquid suction path 168.

Moreover, the configuration according to the second embodiment is that the recessed portion 165 is formed between the aperture portion 155 and the liquid suction path 168, and the liquid is easy to be guided to the liquid suction path 168.

According to the second embodiment, for the explanation's sake, the aperture portion 155 is illustrated comparatively large for the diameter of the front lens element of the objective lens 122, however, it is preferable that a size of the aperture portion 155 be, if practicable, small in order to narrow the range where the contaminants and the bacteria occur.

Further, when eliminating the liquid on the substrate 10A via the liquid suction path 168, the stage portion 121 may be finely moved in an upward direction (toward the objective lens 122) in a way that synchronizes with a suction timing of the liquid suction device (41-44).

Third Embodiment

Figure 14:
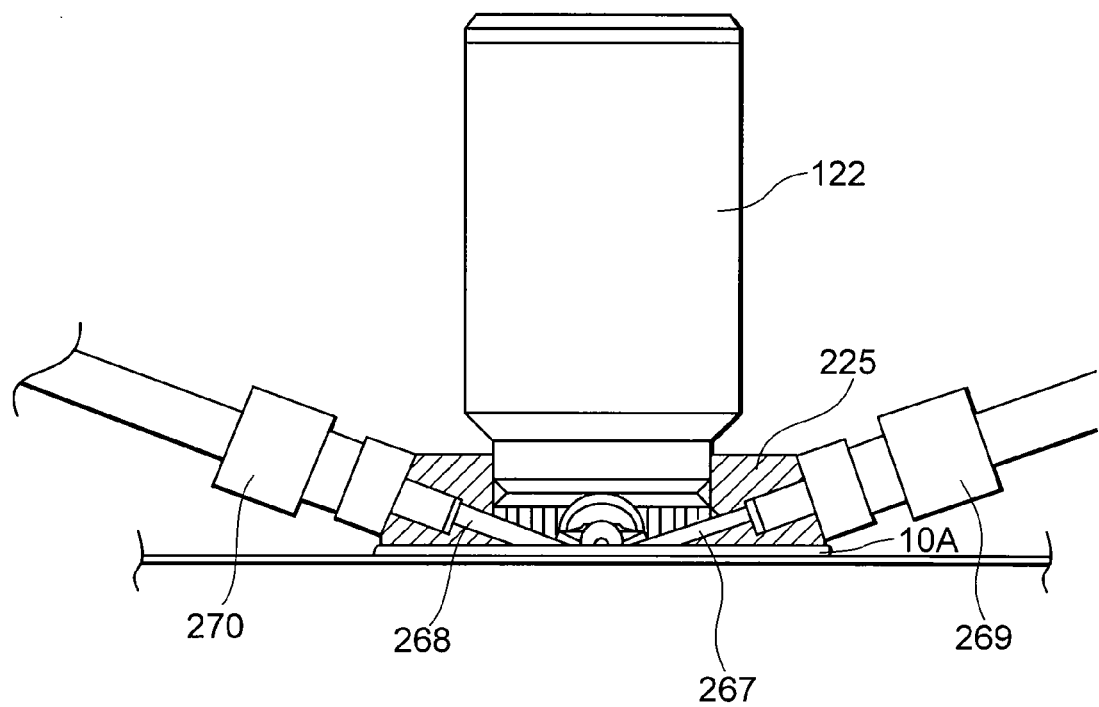
FIG. 14 is a sectional view showing a state of attaching an adaptor 225 to the objective lens 122 in the microscope apparatus in a third embodiment of the present invention.

FIG. 14 is a view illustrating a construction of an adaptor attached to an objective lens of a liquid immersion microscope in a microscope apparatus according to a third embodiment of the present invention. A difference from FIG. 12 is that a liquid supply path is provided.

FIG. 14 is a sectional view showing a state of attaching an adaptor 225 to the objective lens 122. In the third embodiment, the adaptor 225 is provided with a liquid supply path 267 and a liquid suction path 268. In the same way as in the second embodiment, the adaptor 225 is fixed to the objective lens 122 by three pieces of fixing screws 164 (see FIG. 12) disposed in three directions centered at the objective lens 122. Further, FIG. 15 is a view of the adaptor 225 as viewed from the bottom face (on the side of the substrate 10A).

As illustrated in FIG. 14, the adaptor 225 includes the liquid supply path 267 leading to the liquid discharge device (31-35) in FIG. 2 via a joint 269 and the liquid suction path 268 leading to the liquid suction device (41-44) in FIG. 2 via a joint 270.

Figure 15:
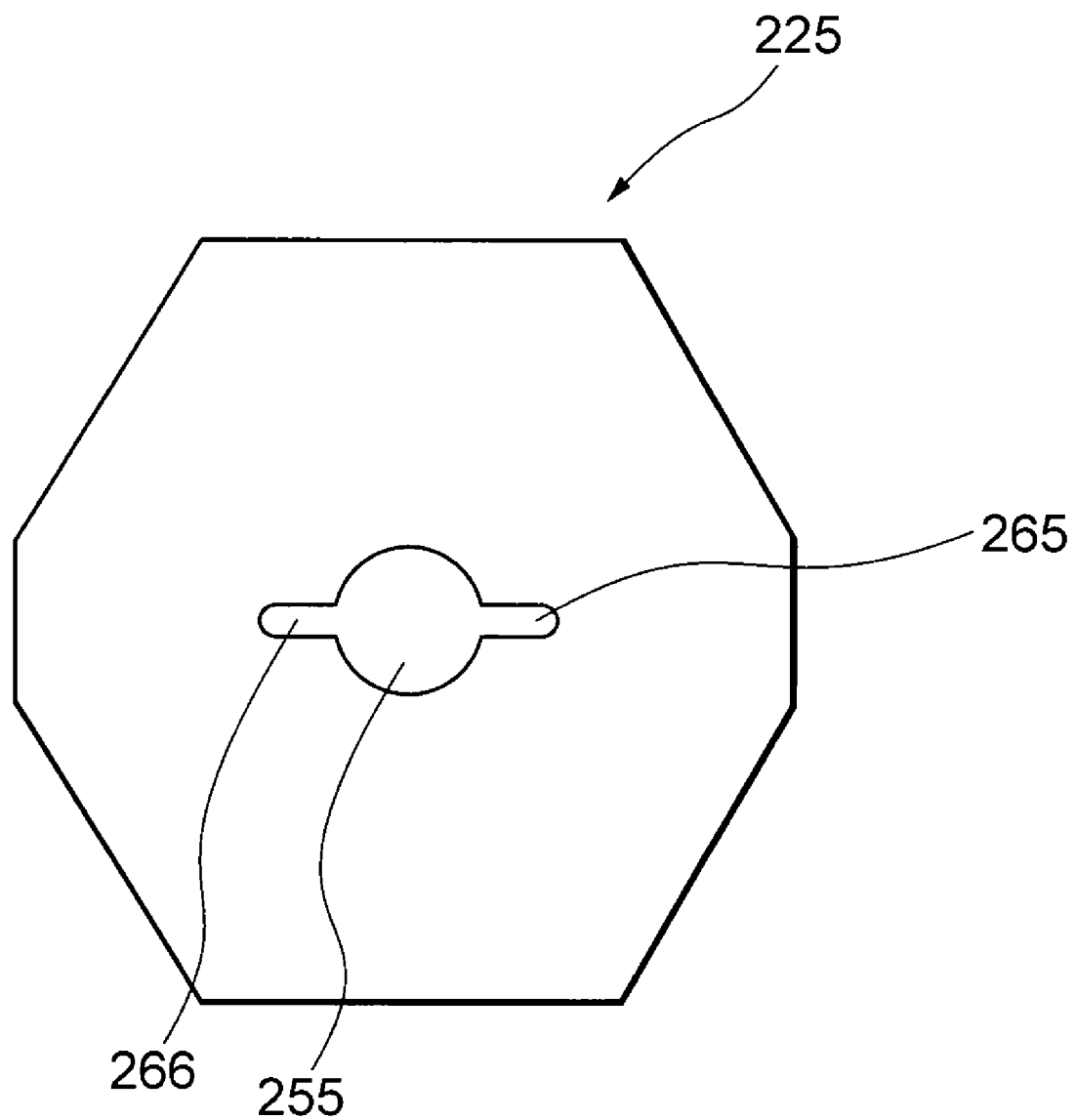
FIG. 15 is a view of an adaptor 225 as viewed from a bottom face.

FIG. 15 is a view of the adaptor 225 as viewed from the bottom face (on the side of the substrate 10A). As illustrated in FIG. 15, the aperture portion 155 is formed with a recessed portion 265 leading to the liquid supply path 267 and a recessed portion 266 leading to the liquid suction path 268. Namely, the liquid supplied from the liquid discharge device (31-35) is supplied along a route formed by the liquid supply path 267, the recessed portion 265, a central portion (above the portion, to be observed, of the substrate 10A) of an aperture portion 255 and the recessed portion 266 in this sequence, and is thereafter eliminated by the liquid suction device (41-44) via the liquid suction path 268. Further, a slight gap exists between the bottom face of the adaptor 225 and the substrate 10A, whereby the substrate 10A does not come into direct contact with the adaptor 225.

It is to be noted that according to the second embodiment and the third embodiment, the paths for the liquid are formed by providing the recessed portions 165, 265, 266 in the aperture portions 155, 255 of the adaptors, however, another available configuration is that the aperture portions of the adaptors 125, 225 are each formed in a circular shape, and the path is formed by providing the recessed portion in a member in the vicinity of the front lens element of the objective lens 122.

Fourth Embodiment

Figure 18:
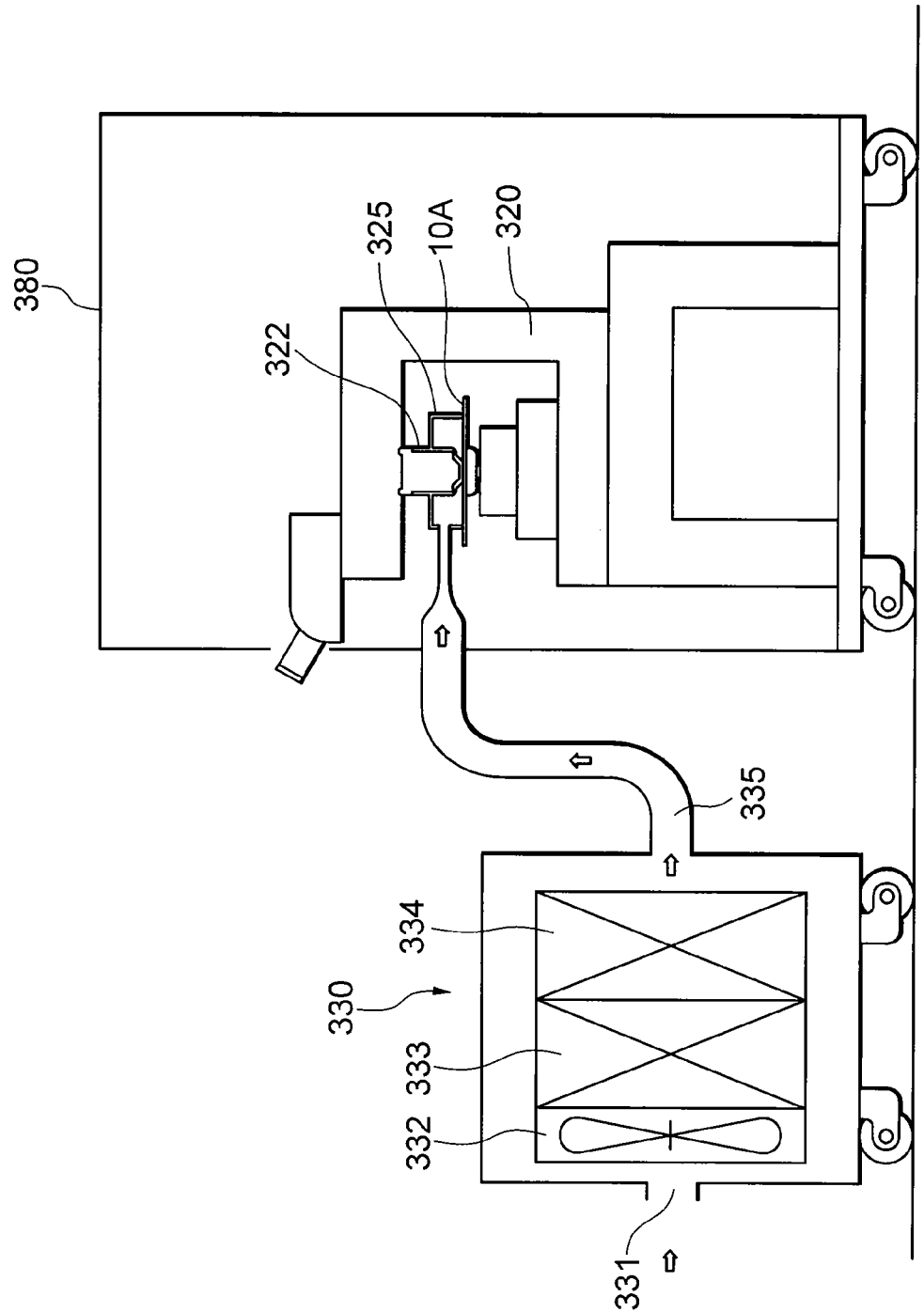
FIG. 18 is a view illustrating a construction of the microscope apparatus in a fourth embodiment of the present invention.

FIG. 18 is a view showing a construction of a microscope apparatus according to a fourth embodiment of the present invention. A liquid immersion microscope 320 is installed within an enclosure 380.

The microscope apparatus is provided with a filter fan unit (FFU) 330. The FFU-330 is constructed of an outside air intake port 331, a fan 332 that blows downstream the taken-in outside air, a chemical filter 333 that collects at least an organic gas contained in the air, an HEPA (High Efficiency Particulate Air) filter 334 that collects dusts in the air, and a supply nozzle 335 that discharges the clean air flowing through these filters 333, 334.

Figure 16:
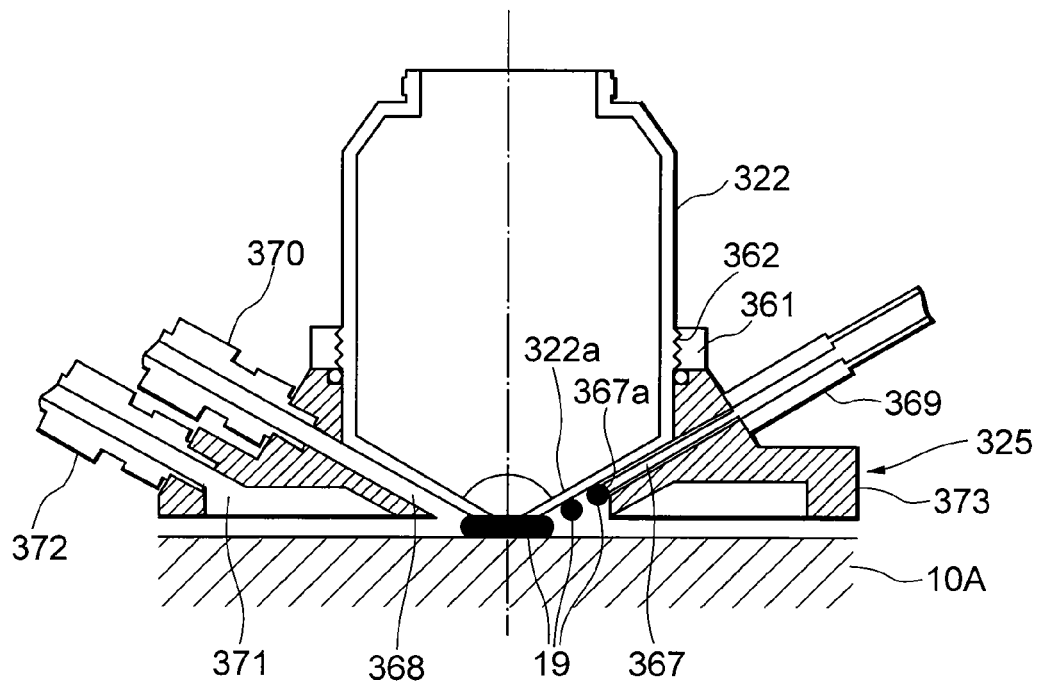
FIG. 16 is a sectional view showing a state of attaching an adaptor 325 to an objective lens 322 in the microscope apparatus in a fourth embodiment of the present invention.

FIG. 16 is a view illustrating a construction of the adaptor attached to the objective lens of the liquid immersion microscope in the microscope apparatus according to the fourth embodiment. FIG. 16 is a sectional view showing a state of attaching an adaptor 325 to an objective lens 322 of the liquid immersion microscope 320. In the fourth embodiment, the adaptor 325 is formed with a liquid supply path 367, a liquid suction path 368 and a gas supply path 371. A screw thread 362 is formed along the periphery of the side face of the liquid immersion objective lens 322 and is screw-fitted to a screw portion 361 of the adaptor 325, whereby the adaptor 325 is attached to the liquid immersion objective lens 322.

The liquid supply path 367 of the adaptor 325 is led to the liquid discharge device (31-35) via a joint 369. The liquid suction path 368 is led to the liquid suction device (41-44) via a joint 370. Further, the gas supply path 371 is led to a supply nozzle 335 of the FFU-330 via a joint 372.

The adaptor 325 is provided with a chamber 373 so as to encompass an air space between the adaptor 325 and the substrate 10A. Accordingly, when the clean air is blown out of the gas supply path 371, the clean air containing neither the organic matters nor the particles, which is purified by the FFU-330, can be supplied to the periphery of the liquid in the vicinity of a focal position of the liquid immersion objective lens 322 (i.e., between the liquid immersion objective lens 322 and the surface of the substrate 10A). The periphery of the liquid is locally purged of the organic matters owing to the clean air, and the liquid is not exposed to the air containing the organic matters, with the result that none of the organic matters existing in the air are dissolved in the liquid.

Note that the clean air from the FFU-330 may be supplied by means of the electromagnetic valve etc only when making the observation and may also be flowed at all times.

Moreover, no problem arises if a slight gap exists between the surface of the substrate 10A and a lower edge of the chamber 373. The gap ($\alpha$) therebetween is set equal to or slightly larger than a working distance (W.D.) between the liquid immersion objective lens 322 and the surface of the substrate 10A. With this contrivance, an air space within the chamber 373 has a pressure higher than the ambient atmospheric air. Therefore, the clean air can be leaked out of the gap ($\alpha$). If a relationship between the pressures at this time is set such as a water pressure>an air pressure within the chamber 373>an atmospheric pressure outside the chamber 373, the liquid can be smoothly supplied, and the unclean atmospheric air can be prevented from entering the chamber 373.

Figure 17:
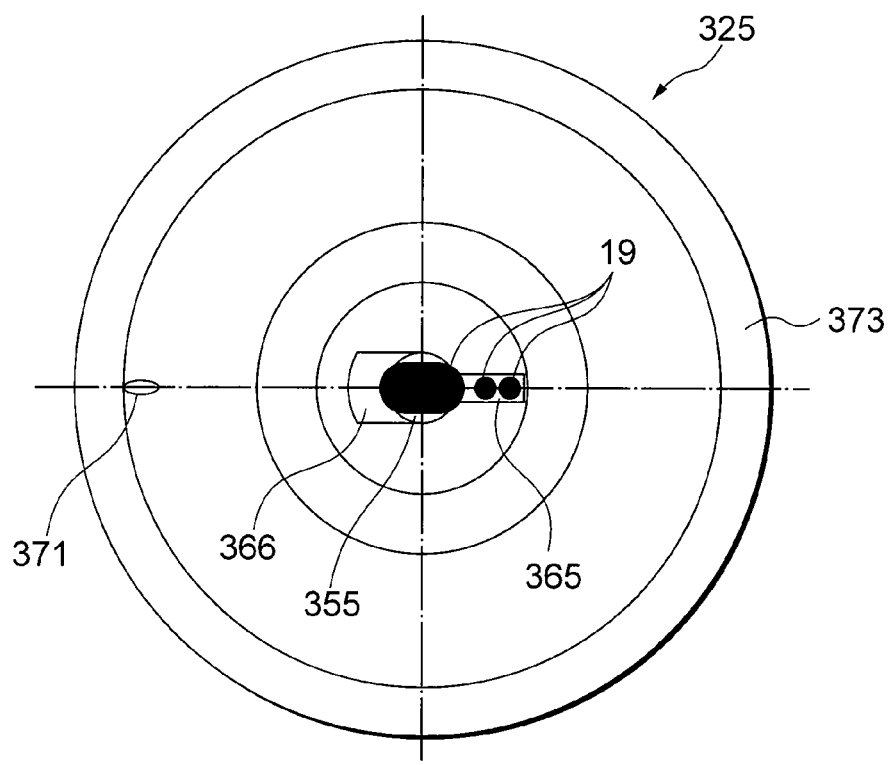
FIG. 17 is a view of an adaptor 325 as viewed from a bottom face.

FIG. 17 is a view of the adaptor 325 as viewed from the bottom face (on the side of the substrate 10A). The adaptor 325 is formed at the center with an aperture portion 355 for the observation through the objective lens 322. The adaptor 325 is connected to the objective lens 322 so that the center of the aperture portion 355 is substantially coincident with the optical axis of the objective lens 322. The aperture portion 355 is formed with a recessed portion 365 leading to the liquid supply path 367 and a recessed portion 366 leading to the liquid suction path 368.

In the same way as in the third embodiment, the liquid fed from the liquid discharge device (31-35) is supplied along a route formed by the liquid supply path 367, the recessed portion 365, a central portion (above the portion, to be observed, of the substrate 10A) of the aperture portion 355 and the recessed portion 366 in this sequence, and is thereafter eliminated by the liquid suction device (41-44) via the liquid suction path 368.

As illustrated in FIG. 16, a front end 367a of the liquid supply path 367 exists not in the vicinity of the front lens element of the objective lens 322 but in the vicinity of a side face 322a of the objective lens 322. The liquid 19 fed from the liquid supply path 367 is supplied to the central portion of the aperture portion 355 along the side face 322a of the objective lens 322. A channel, which facilitates the flow of the liquid 19, is formed along a route extending from a position, vicinal to the front end 367a of the liquid supply path 367, of the side face 322a to the central portion of the aperture portion 355.

Available materials used for the adaptors utilized in the first embodiment through the fourth embodiment are stainless steels, PEEK (PolyEther Ether Ketone) materials, fluororesin-series materials and so on. Preferable materials are materials that have no elution to the liquid and are hard to be electrostatically charged.

It is preferable that in the first embodiment through the fourth embodiment, the objective lens be tightly fitted to the adaptor so as to be hard to leak when sucking. An external edge of the objective lens is fitted to the adaptor, and further, for improving the tight-fitting, a sealing material (a bonding agent, a seal ring, etc) may be provided at a boundary between the objective lens and the adaptor.

Moreover, a water-repellent coat may be provided on the surface of the adaptor formed with the liquid supply path, the liquid suction path, the aperture portion and the recessed portion.

Modified Example of Fourth Embodiment

The fourth embodiment has the configuration that the gas supply path 371 of the adaptor 325 is led to the supply nozzle 335 of the FFU-330, thereby supplying the clean air to the periphery of the liquid in the vicinity of the focal position of the liquid immersion objective lens 322, however, the gas supply path 371 may also be led to a gas source from which to supply an inert gas. This configuration is, in FIG. 18, realized by linking the gas source in place of the FFU-330 connected to the supply nozzle 335.

The inert gas fed from the gas source is supplied into the chamber 373 along the gas supply path 371 via the supply nozzle 335. The inert gas may be any one of $N_2$, The, Ne, Ar gas, etc. The inert gas may be supplied by means of an electromagnetic valve etc only when conducting the observation and may also remain flowing at all times.

When the inert gas is jetted out of the gas supply path 371, the inert gas can fill the periphery of the vicinity of the focal position (i.e., between the liquid immersion objective lens 322 and the surface of the substrate 10A) of the liquid immersion objective lens.

In this state, the liquid, discharged to between the liquid immersion objective lens 322 and the surface of the substrate 10A, is further discharged into an inert gas atmosphere, and the dissolved oxygen existing in the liquid does not increase because of absorbing no oxygen in the atmospheric air. Namely, the periphery of the liquid vicinal to the focal position of the liquid immersion objective lens 322 is locally purged of the oxygen owing to the inert gas, wherein the liquid is not exposed to the oxygen, and the oxygen is not dissolved into the liquid.

Fifth Embodiment

Figure 19:
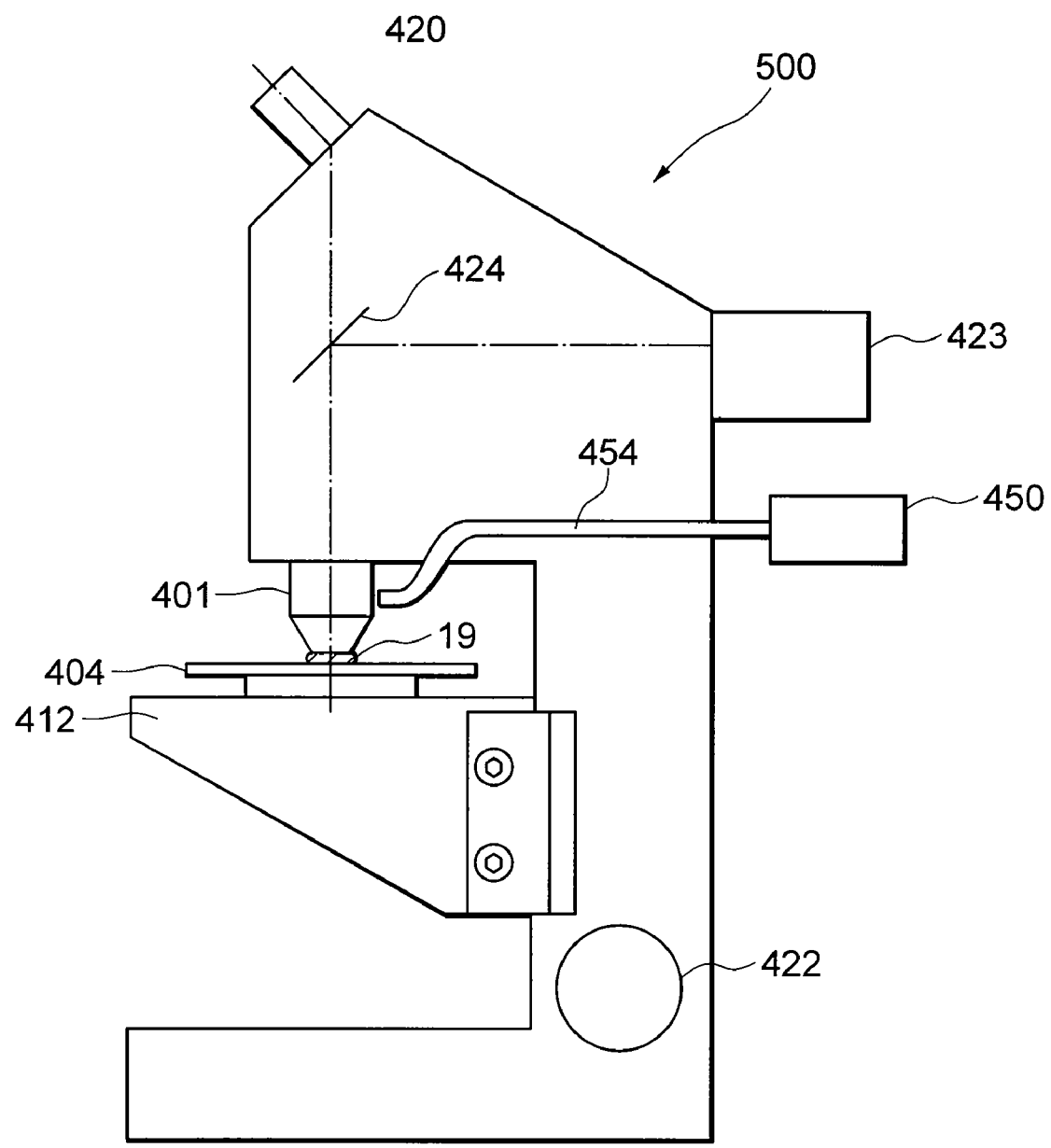
FIG. 19 is a view illustrating a construction of a liquid immersion microscope 500 in a fifth embodiment of the present invention.

FIG. 19 shows a construction of a liquid immersion microscope 500 in a fifth embodiment of the present invention. Illumination light emitted from a light source 423 travels through an unillustrated illumination optical system and, after being reflected by a half mirror 424, gets incident on a liquid immersion objective lens 401. The light source 423 involves using a mercury lamp, a halogen lamp, a xenon lamp, etc. In the fifth embodiment, a reflected image of a sample 404 is observed by employing the half mirror 424, however, in the case of observing a fluorescence image of the sample 404, a dichroic mirror as a substitute for the half mirror 424 may be disposed. Further, in the case of observing a transmitted image of the sample 404, a light source (unillustrated) for transmissive illumination may be disposed under the sample, and the half mirror 424 may be removed from a light path. The sample 404 is irradiated with the illumination light incident upon the liquid immersion objective lens 401 via the liquid 19. The sample 404 involves employing a semiconductor wafer and a liquid crystal substrate as samples for an industrial microscope. Further, a sample for a biological microscope involves using a slice of tissue sealed in between a slide glass and a cover glass. The illumination light reflected by the sample 404 again travels through the liquid 19, converges at the liquid immersion objective lens 401, and penetrates the half mirror 424, whereby the sample 404 is observed by an eyepiece 420.

The sample 404 is placed on an XYZ-stage 412 and fixed onto the XYZ-stage 412 by an unillustrated holder. A central portion of the XYZ-stage 412 is formed with a hole smaller than a diameter of the liquid immersion objective lens 401, and an observation area of the sample 404 is disposed above this hole. The hole of the XYZ-stage 412 is used for the transmissive observation of the sample 404, wherein the sample 404 is irradiated with the light coming from an unillustrated transmissive light source from under the sample 404, and the light penetrating the sample 404 is converged by the liquid immersion objective lens 401. Note that a case of observing the sample 404 by epi-illumination over the sample 404 does not entail forming the hole for the transmissive observation in the XYZ-stage 412. The XYZ-stage 412 is moved in a Z-direction (an optical-axis direction) by manipulating a focus knob 422, whereby focusing is attained. A liquid supply tube 454 of a liquid supply device 450 is disposed in the vicinity of the liquid immersion objective lens 401, and the liquid 19 is supplied to a side face of the liquid immersion objective lens 401.

Figure 20:
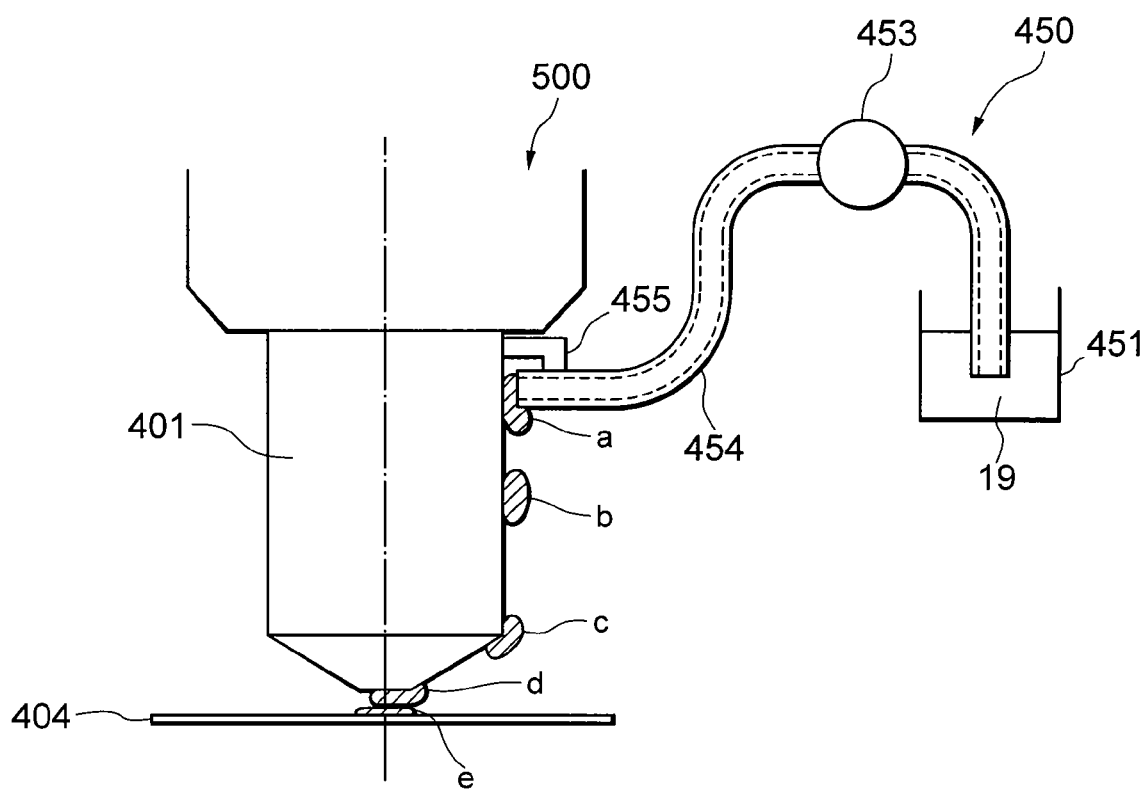
FIG. 20 is a view of a liquid immersion objective lens 401 and a sample 404 as viewed from a side face.

FIG. 20 shows a view of the liquid immersion objective lens 401 of the liquid immersion microscope 500 and the sample 404 as viewed from the side face. The liquid supply device 450 is disposed in the vicinity of the side face of the liquid immersion objective lens 401. The liquid supply device 450 is constructed of a liquid storage tank 451 stored with the liquid 19, a pump 453 and a liquid supply pipe 454. The liquid 19 filling the liquid storage tank 451 is pumped up by the pump 453, and is led to the vicinity of the liquid immersion objective lens 401 via the liquid supply pipe 454. The liquid supply pipe 454 is held by a holding tool 455 in the vicinity of the liquid immersion objective lens 401. An end face, to which the liquid is supplied, of the liquid supply pipe 454 is held in a face-to-face relationship with the side face of the liquid immersion objective lens 401, and is also held at a distance of 1 mm-2 mm away from the side face of the liquid immersion objective lens 401. The liquid 19 stored in the liquid storage tank 451 is supplied to the liquid immersion objective lens 401 by the liquid supply device 450, in which case the liquid 19 is supplied while the observer operates the pump 453.

Next, an operation of observing the sample 404 by use of the liquid immersion microscope exemplified in the fifth embodiment, will be described. To start with, the sample 404 is placed on the XYZ-stage 412. The sample 404 placed on the XYZ-stage 412 is fixed by the unillustrated holder. Subsequently, the observation area of the sample 404 is moved to a position entering the view of field of the liquid immersion objective lens 401. When confirming that the sample 404 has been moved to the observation position, the sample 404 is moved in the optical-axis direction of the liquid immersion objective lens 401 and is made to close to the liquid immersion objective lens 401.

Next, the liquid 19 is supplied to between the liquid immersion objective lens 401 and the sample 404. When the observer manipulates an unillustrated pump switch, the liquid stored in the liquid storage tank 451 is pumped up by the pump 453, and the liquid 19 flows out of the end face of the liquid supply pipe 454. The liquid 19 stored in the liquid storage tank 451 involves using water if the liquid immersion objective lens 401 is classified as a water immersion objective lens and using oil having a predetermined refractive index if the liquid immersion objective lens 401 is classified as an oil immersion objective lens. Note that a quantity of the liquid 19 to be supplied is preset and equal to or smaller than 0.1 ml in a normal case.

The liquid 19 flowing out of the end face of the liquid supply pipe 454 is adsorbed to the side face of the liquid immersion objective lens 401 in the face-to-face relationship with the end face of the liquid supply pipe 454, and comes to a swirled state due to the surface tension (position a in FIG. 20). The liquid 19 adsorbed to the side face of the liquid immersion objective lens 401 moves downward along the side face of the liquid immersion objective lens 401 due to the gravity (position b in FIG. 20). A front edge of the liquid immersion objective lens 401 takes a conical shape and is a portion at which to dispose the foremost lens element in the lens elements building up the liquid immersion objective lens 401. The liquid 19 moved to under the liquid immersion objective lens 401 flows through the conical portion of the front edge of the liquid immersion objective lens 401 (position c in FIG. 20) and reaches the foremost lens element (position d in FIG. 20). The liquid 19 reaching the foremost lens element drops down onto the sample 404 due to the gravity (position e in FIG. 20). Note that if the upper surface of the sample 404 is sufficiently proximal to the foremost lens element of the liquid immersion objective lens 401, the liquid 19 does not drop down onto the sample 404 but fills a space between the sample 404 and the foremost lens element of the liquid immersion objective lens 401. With the operation described above, the liquid 19 is supplied onto the observation area of the sample 404.

Next, in this state, the observer focuses the sample 404 by moving the XYZ-stage 412 in the optical-axis direction while seeing the sample 404 with the eyepiece 420 of the unillustrated liquid immersion microscope, thus observing the sample. In the case of observing another area after finishing observing one observation area of the sample 404, the liquid 19 is, after moving the sample 404 in the XY-direction (horizontal direction), again supplied by the liquid supply device 450 to between the sample 404 and the liquid immersion objective lens 401. Note that if the liquid 19 is the water, the water might be evaporated during the observation. In this case also, the liquid 19 can be supplied by the liquid supply device 450.

In the liquid immersion microscope according to the fifth embodiment, the liquid 19 used for the liquid immersion objective lens 401 is supplied from the side face of the liquid immersion objective lens 401, then further supplied to the sample 404 via the foremost lens element of the liquid immersion objective lens and can be therefore supplied surely onto the observation area of the sample 404. In the fifth embodiment, the side face of the liquid immersion objective lens 401 is used as it is without being particularly worked, however, it may not cause any inconvenience to form the side face of the liquid immersion objective lens 401 with a channel for guiding the liquid 19 to the front edge of the liquid immersion objective lens 401. For example, a semicircular channel, which is on the order of 2 mm in diameter, is formed rectilinearly extending from the side face of the liquid immersion objective lens 401 in the face-to-face relationship with the side face of the liquid supply pipe 454 to the vicinity of the foremost lens element of the liquid immersion objective lens 401. With the formation of the channel, the liquid 19 is surely guided along the channel to the foremost edge of the liquid immersion objective lens 401 and drops down onto the sample 404. The channel formed in the side face of the liquid immersion objective lens 401 is not limited to the rectilinear channel, and it may not cause any inconvenience to form a helical channel.

It should be noted that the fifth embodiment has exemplified the liquid supply device 450 using the pump 453, however, it may not cause any inconvenience that the observer supplies the liquid 19 to the side face of the liquid immersion objective lens 401 by use of a dropping pipette.

Further, in the fifth embodiment, the liquid 19 is adsorbed to the side face of the liquid immersion objective lens 401 and thus guided to the foremost lens element thereof, however, the absorbing position is not limited to the side face thereof, and it may not cause any inconvenience that the liquid 19 is adsorbed to the conical portion peripheral to the foremost lens element of the liquid immersion objective lens 401. Note that the side face of the objective lens includes this conical portion.

What is claimed is:

1. An adaptor for a liquid immersion type microscope, the microscope including a support member for supporting a specimen thereon, a liquid immersion type objective lens, a discharging member for discharging a liquid between a front edge of the objective lens and the specimen, and a sucking member for sucking the liquid from the specimen, the adaptor being attached to the liquid immersion objective lens and arranged between the lens and the specimen when observing the specimen with the microscope, said adaptor comprising:

a body member having a connecting portion configured to be attached to the liquid immersion objective lens at a periphery of the front edge such that a front lens element of the objective lens is exposed at a central portion of the body member;

the body member having inclined surfaces on a side of the body member opposite the front edge of the objective lens, a first portion of each inclined surface being adjacent to the front lens element of the objective lens, the inclined surfaces being angled such that each inclined surface gets closer to an image side of said liquid immersion objective lens as it gets farther away from the front lens element, one of the inclined surfaces extending from the first portion thereof adjacent the front lens element to a second portion thereof at a side face of the objective lens;

the body member having protruded portions adjacent to said inclined surfaces and protruding toward an object side of said liquid immersion objective lens such that an aperture portion is formed at the second portion of said one of the inclined surfaces, the aperture portion being bounded by said protruded portions and the specimen at the second portion at the side face of said liquid immersion objective lens.

2. An adaptor for a microscope according to claim 1, wherein a width of another of the inclined surfaces is substantially constant irrespective of a distance from the front lens element, and a width of said one of the inclined surfaces is larger at an outside portion, which extends at a predetermined distance from the front lens element to the side face of the lens, than at an inside portion, which extends from the front lens element predetermined distance, and the width of the inside portion of said one of the inclined surfaces is substantially constant irrespective of the distance from the front lens element and substantially equal to the width of the another of the inclined surfaces.

3. An adaptor for a microscope according to claim 2, wherein the width of the outside portion of said one inclined surface increases with distance from the front lens element.

4. An adaptor for a microscope according to claim 1, wherein said protruded portions have a flat shape substantially perpendicular to an optical axis of said liquid immersion objective lens.

5. An adaptor for a microscope according to claim 1, wherein the discharging member is provided on said one of the inclined surfaces, and the sucking member is provided on another of the inclined surfaces.

6. A microscope apparatus comprising:

a support member for supporting a substrate as an observation object;

an objective lens of a liquid immersion system;

a discharging member configured to discharge a liquid between a front edge of said objective lens and said substrate; and a sucking member configured to suck the liquid from said substrate, wherein an adaptor is attached to the objective lens and arranged between the objective lens and the substrate when observing the substrate with the microscope, the adaptor including:

a body member attached to the objective lens at a periphery of the front edge such that a front lens element of the objective lens is exposed at a central portion of the body member;

the body member having inclined surfaces on a side of the body member opposite the front edge of the objective lens, a first portion of each inclined surface being adjacent to the front lens element of the objective lens, the inclined surfaces being angled such that each inclined surface gets closer to an image side of said objective lens as it gets farther away from the front lens element; and the body member having protruded portions adjacent to said inclined surfaces and protruding toward a substrate side of said objective lens, wherein one of the inclined surfaces extends from the first portion thereof adjacent the front lens element to a second portion thereof at a side face of said objective lens such that an aperture portion is formed at the second portion of said one of the inclined surfaces, the aperture portion being bounded by said protruded portions and said substrate at the second portion at the side face of the objective lens, said discharging member includes a first tubular member provided on said one of the inclined surfaces, and the liquid is discharged by use of said first tubular member, and said sucking member includes a second tubular member provided on another of said inclined surfaces, and the liquid is sucked while taking in air through said aperture portion by use of said second tubular member.

7. A microscope apparatus according to claim 6, wherein a width of said another of the inclined surfaces is substantially constant irrespective of a distance from the front lens element, and a width of said one of the inclined surfaces is larger at an outside portion, which extends at a predetermined distance from the front lens element to the side face of the lens, than at an inside portion, which extends from the front lens element the predetermined distance, and the width of the inside portion of said one of the inclined surfaces is substantially constant irrespective of the distance from the front lens element and substantially equal to the width of the another of the inclined surfaces.

8. A microscope apparatus according to claim 7, wherein the width of the outside portion of said one inclined surface increases with distance from the front lens element.

9. A microscope apparatus according to claim 7, wherein a width of said second tubular member is substantially equal to the width of said another of the inclined surfaces.

10. A microscope apparatus according to claim 6, wherein a central axis of said first tubular member and a central axis of said second tubular member are coplanar with an optical axis of said objective lens.

11. A microscope apparatus according to claim 6, wherein said protruded portions have a flat shape substantially perpendicular to the optical axis of said objective lens.

12. A microscope apparatus according to claim 6, wherein a tip of said first tubular member is positioned in the vicinity of the front lens element of said objective lens, and said discharging member controls a pressure and a flow rate when discharging the liquid and finishes discharging the liquid in a state where the liquid immediately after being discharged remains in contact with the tip of said first tubular member.

13. A microscope apparatus according to claim 6, wherein respective tips of said first tubular member and of said second tubular member are positioned in the vicinity of the front lens element of said objective lens,
said discharging member controls a pressure and a flow rate when discharging the liquid and finishes discharging the liquid in a state where the liquid immediately after being discharged is in contact with the tips of said first tubular member and of said second tubular member.

14. A microscope apparatus according to claim 6, wherein said sucking member includes, in addition to said second tubular member, a third tubular member provided in the vicinity of said first tubular member, and sucks, after sucking part of the liquid by use of said second tubular member, the remaining of the liquid by said third tubular member.

15. A microscope apparatus according to claim 6, wherein said discharging member determines a discharge quantity of the liquid corresponding to a physical property of said substrate that is registered as a recipe beforehand.

16. A microscope apparatus according to claim 6, wherein a width of said first tubular member is smaller than a width of said one of the inclined surfaces.

17. A microscope apparatus according to claim 16, wherein a width of said second tubular member is larger than the width of said first tubular member.

18. A microscope apparatus according to claim 6, wherein a width of said second tubular member is larger than a width of said first tubular member.

* * * * *